United States Patent [19]
Berkebile et al.

[11] 3,931,500
[45] Jan. 6, 1976

[54] SYSTEM FOR OPERATING A BOILING WATER REACTOR STEAM TURBINE PLANT WITH A COMBINED DIGITAL COMPUTER AND ANALOG CONTROL

[75] Inventors: Gary W. Berkebile; Francesco Lardi, both of Pittsburgh, Pa.; Leaman B. Podolsky, Wilmington, Del.

[73] Assignee: Westinghouse Electric Corporation, Pittsburgh, Pa.

[22] Filed: Nov. 13, 1973

[21] Appl. No.: 415,869

[52] U.S. Cl. ............... 235/151.21; 176/24; 415/17; 444/1
[51] Int. Cl. .................. G06f 15/56; F01b 25/00
[58] Field of Search ........... 235/151.21, 151; 444/1; 176/19 EC, 20, 21, 24, 25, 55, 39, 87; 60/39.24, 39.26, 39.3, 108 R, 108 S; 415/1, 16, 17

[56] References Cited
UNITED STATES PATENTS

| | | | |
|---|---|---|---|
| 3,552,872 | 1/1971 | Giras et al. | 415/17 |
| 3,572,958 | 3/1971 | Jensen | 415/17 |
| 3,588,265 | 6/1971 | Berry | 235/151.21 UX |
| 3,630,839 | 12/1971 | Podolsky | 176/24 |
| 3,709,626 | 1/1973 | Eggenberger | 415/17 |

*Primary Examiner*—Joseph F. Ruggiero
*Attorney, Agent, or Firm*—H. W. Patterson

[57] ABSTRACT

A combined digital computer/analog control system for operating a boiling water reactor steam turbine power plant, wherein the digital computer provides a throttle pressure setpoint, speed error and load demand for controlling the plant depending upon the operational states of the system, is disclosed. The analog portion of the system also controls the plant in cooperation with the digital computer for certain operational states and conditions when the digital computer is in operation; and the analog system alone controls the plant when the digital computer is out of service. The transfer between such control is effected depending upon the operational states of the system and certain of the components therein. The system also includes in the digital computer portion, the provision for preventing a load demand which is outside the limits of the reactor circulation system when the reactor is in a state of automatic operation.

10 Claims, 6 Drawing Figures

SYSTEM FOR OPERATING A BOILING WATER REACTOR STEAM TURBINE PLANT WITH A COMBINED DIGITAL COMPUTER AND ANALOG CONTROL

CROSS REFERENCE TO RELATED APPLICATION

U.S. patent application Ser. No. 415,868 entitled "Improved System And Method For Operating A Boiling Water Reactor Steam Turbine Plant With Dual Analog Throttle Pressure Controllers" filed by L. B. Podolsky, G. W. Berkebile and F. Lardi concurrently herewith and assigned to the present assignee.

BACKGROUND OF THE INVENTION

The present invention relates to steam turbine plants and more particularly to electric power plants operated by steam turbines for which the steam supply is provided by a nuclear boiling water reactor.

In a boiling water nuclear reactor, the nuclear fuel is structured with a suitable geometry to provide for a sustained chain nuclear reaction as the coolant water passes through the fuel arrangement. Conventionally, the nuclear fuel is housed in elongated metallic tubes which are in turn assembled and supported in parallel arrays or bundles. The reactor core is formed from an assembly of the fuel bundles, and it is housed in a large pressure vessel with provision for coolant flow along all of the fuel elements. Neutron absorbing control rods are supported within the core for movement relative to the fuel elements.

The design of the core and other reactor parameters determine the reactor power rating. Mechanical, nuclear, hydraulic and other details of the reactor design are the result of development programs aimed at achieving efficient performance for the plant owner.

Since water density is a large determinant of the rate of generation of slow neutrons which are required for the controlled propagation of the chain nuclear reaction, the power operating level of the reactor is partly determined by the accumulation of steam voids in the core volume. Increased coolant flow causes faster fuel rod cooling with reduced boiling and, accordingly, reduced void accumulation and higher reactor power. Decreased coolant flow has the opposite effects. Typically, coolant flow control can be used to control the boiling water reactor power level within a range of about 20% or 25% with a preset control rod placement.

The reactor generated steam is normally directed through separators and dryers within the pressure vessel, and the dry saturated steam is directly channeled at a pressure such as 1000 psi and a temperature such as 545°F to the utilization equipment, i.e., the turbine generator unit(s) of the electric power plant. Separated water is combined in the pressure vessel with external and internal recirculation flows and with return and makeup feedwater flow.

Since the boiling water reactor plant is the direct cycle type and since outlet steam pressure and reactor vessel pressure affect the void accumulation in the reactor core, it is desirable to operate the turbine inlet valves to determine the turbine and generator load level subject to pressure regulating demands of the reactor. With reactor pressure maintenance within a relatively narrow pressure band such as about 30 psi, reactor power level is controlled by coolant flow control within a limited range or by control rod movement if a different power range is required to meet load demand on the turbine generator unit(s).

In general, the steam turbine energization level is determined by the flow of the turbine inlet steam which in turn is determined by the steam conditions at the outlet of the steam source and by steam inlet valve positioning. The turbine drive power supplied for the plant generators is desirably controlled to satisfy electrical load demand and frequency participation demand placed on the electric power plant by the plant operator or by an economic dispatch computer or by other means.

At substantially constant temperature throttle steam, turbine power is porportional to turbine steam flow, and if the throttle pressure is also substantially constant, the steam flow is proportional to impulse chamber steam pressure or the ratio of the impulse chamber steam pressure to the throttle steam pressure. As already indicated, positioning of the inlet steam valving must provide for reactor vessel pressure regulation as well as turbine energization level control. When the boiling water reactor power level corresponds to the plant load demand, the turbine inlet valves are positioned to produce both the desired reactor vessel pressure and the turbine steam flow required for satisfying plant electrical load demand.

A steam bypass system is also usually provided to direct steam flow from the reactor outlet to the plant condenser under certain conditions. Steam bypass in effect provides an interface between the boiling water reactor and the steam turbine during reactor startup and shutdown and during other periods such as during load rejection. In these cases, steam supplied by the reactor but not needed by the turbine is channeled to the condenser under control imposed on the bypass system by the throttle pressure control system.

To control a boiling water reactor-steam turbine plant, it has been customary to use the turbine follow mode of operation. After plant startup, corrective changes are made in the reactor power level by automatic or manual reactor coolant flow control or by manual or possibly automatic control rod operation in order to satisfy plant load demand. Turbine throttle pressure is sensed and the turbine inlet steam valves are operated in the follow mode to control the throttle and reactor vessel pressures and enable turbine steam flow changes to be made to correct the turbine load as the reactor power level is being corrected. To speed up the control, particularly when step changes are made in load demand, the setpoint of the turbine pressure control may be temporarily adjusted in response to the load error.

However, when the turbine and reactor are in automatic control and the recirculation system is either at its low or high limit, a change of load demand or load reference and the resultant movement of the valve position will not result in the desired sustained change of load level since the reactor output is limited. Such a condition causes an excessive deviation of throttle pressure and tends toward unstable reactor operation until the control rods are repositioned.

In the Podolsky U.S. Pat. No. 3,630,839, there is described another kind of control system for boiling water reactor-steam turbine plants. The Podolsky control is a coordinated control system which applies load demand directly to the turbine inlet valve controls as well as the reactor controls to produce better turbine and plant performance within throttle pressure constraints.

In the typical boiling water reactor-steam turbine application, the part of the control system directed to turbine valve control is principally mechanical and hydraulic in character with some electrical circuitry such as that involved in the throttle pressure sensing function. Examples of principally hydraulic turbine inlet valve feedback controls in nonnuclear applications are set forth in U.S. patents to Bryant 2,552,401 and Marlsand 1,777,470. A principally mechanical turbine inlet valve feedback control is shown in U.S. patent to Eggenberger 3,027,137 in a nonnuclear application. Electrohydraulic analog feedback type turbine inlet valve controls have been employed in nonnuclear turbine applications to achieve operational improvements, and examples of such controls are presented in U.S. patents to Bryant 2,262,560, Herwald 2,512,154, Eggenberger 3,097,488, 3,097,489, 3,098,176 and Callan 3,097,490. Further details on conventional electrohydraulic control in nonnuclear applications are presented in a paper entitled "Electrohydraulic Control For Improved Availability And Operation Of Large Steam Turbines" and presented by M. Birnbaum and E. G. Noyes to the ASME-IEEE National Power Conference at Albany, New York during September 19–23, 1965.

In U.S. Patent No. 3,630,839 to Podolsky and U.S. Patent 3,671,390 to Hogle, there is also disclosed a control system for boiling water reactor-steam turbine plants in which electrohydraulic controls are employed to produce better plant operation than that produced by the typical mechanical-hydraulic controls. In the allowed U.S. Patent Application Serial No. 184,157 to Giras and Podolsky, there is disclosed a digital electrohydraulic turbine control system which employs feedforward control principles.

In order to attain the ultimate in flexibility of a digital system and the safety of operation of an analog system in the event of contingencies, it is desirable that such a control system for a boiling water reactor steam turbine plant employ both such systems to cooperate efficiently in the various operating modes, and to transfer from one to the other effectively in the event of certain contingencies of operation.

SUMMARY OF THE INVENTION

In accordance with the principles of the present invention, a boiling water reactor steam turbine power plant includes a recirculation system for varying the rate of steam generation for an existing reactor energy level. A load demand representation is generated for controlling the operation of the reactor recirculation system to change the rate of steam generation and the steam pressure controller for the turbine to anticipate a change in the rate of steam generation. In response to the detection of the operational capability limits of the recirculation system, a change in load demand which requires a rate of steam generation outside of such recirculation limits is prevented.

DESCRIPTION OF THE PREFERRED EMBODIMENT

Figure 1:
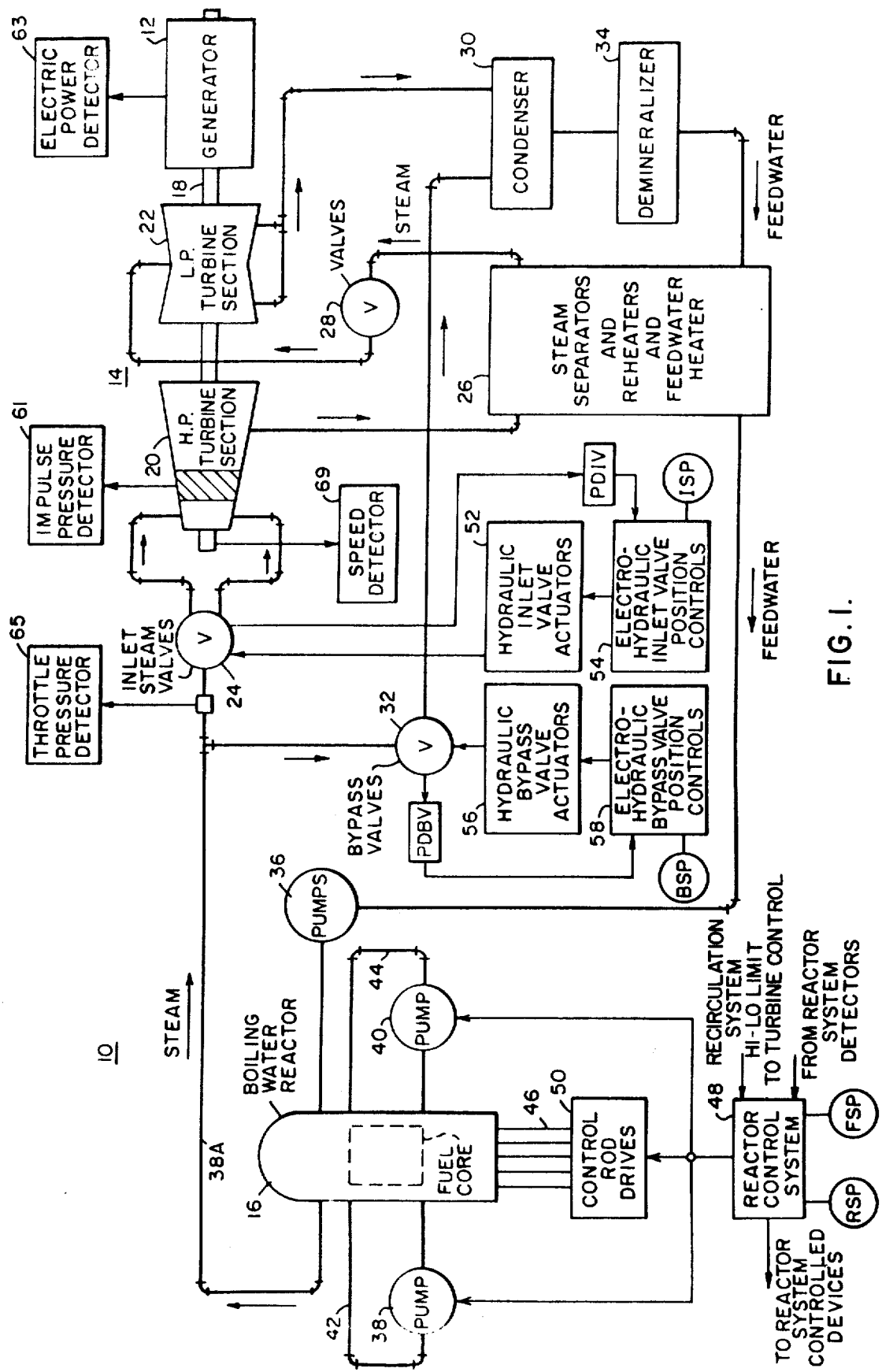
FIG. 1 is a schematic diagram of an electric power plant operated by boiling water reactor and steam turbine apparatus.

More specifically, there is shown in FIG. 1 an electric power plant 10 which is provided with a conventional electric generator 12 operated by a nuclear steam turbine 14 in accordance with the principles of the invention. A steam generating system for the turbine 14 includes a conventional nuclear boiling water reactor 16.

The nuclear steam turbine 14 is provided with a single output shaft 18 which drives the generator 12 to produce speed under steady-state conditions. Under transient electric load change conditions, system frequency may be affected and conforming turbogenerator speed changes would result. At synchronism, power contribution of the generator 12 to the network is normally determined by the turbine steam flow and the throttle pressure at which that flow is supplied by the boiling water reactor 16.

In this instance, the nuclear steam turbine 14 is of the multistage axial flow type and includes a high pressure section 20 and a double flow low pressure section 22. Each of the turbine sections 20 and 22 may include a plurality of expansion stages provided by stationary vanes and an interacting bladed rotor connected to the shaft 18. In other applications, nuclear steam turbines operated in accordance with the present invention can have other forms with more or fewer sections tandemly connected to one shaft or compoundly coupled to more than one shaft. For example, as many as three or more low pressure sections might be employed, and each section could have single flow or double or other plural flow paths.

Steam is directed to the nuclear turbine 14 through conventional inlet steam valves 24. In some installations, the valves 24 may include two or more throttle valves (not specifically indicated) which admit steam to the turbine steam chest (not indicated) and typically a plurality of up to four or more governor control valves (not specifically indicated) which are arranged to supply steam to turbine inlets arcuately spaced about the turbine high pressure casing.

The conventional nuclear turbine startup method is employed. Thus, the turbine speed is raised from the turning gear speed of about 2 RPM to synchronous speed under throttle valve control, if provided, or governor valve control. Then, the power system breaker(s) is closed and the governor vlaves are operated to meet the load demand. On shutdown, similar but reverse practices can be employed or conventional coast-down procedure can be used. In the load control mode, plant electrical load demand is met when the steam flow and throttle pressure conditions cause the turbine energization level to correspond to the plant electrical demand.

The total turbine energization is produced by steam flow through the high pressure section 20 and by steam flow through the low pressure section 22. Steam flow between the two turbine sections is directed through steam separators and reheaters as indicated by block 26 in order to raise the steam enthalpy level to a more efficient value. Stop valve(s) are included in the intersection steam flow path to stop steam flow when necessary for turbine overspeed protection.

Vitiated steam from the low pressure turbine section 22 is directed to a condenser 30. Reactor feedwater flow from the condenser 30 includes any makeup water flow and the flow resulting from condensation of the vitiated turbine steam as well as that resulting from condensation of the steam which is controllably diverted from the turbine 14 through bypass valves 32 directly to the condenser 30.

The feedwater flow is directed from the condenser 30 to a demineralizer 34 where corrosion products and other impurities are removed from the fluid. From the demineralizer 34, the feedwater is driven by one or more feedwater pumps 36 through a feedwater heater system indicated in the block 26 and into the pressure vessel of the nuclear boiling water reactor 16.

In the reactor 16, heat produced in the fuel rods contained within the fuel core is transferred to the coolant which flows along the rods. Steam is collected at the top of the pressure vessel and directed through one or more conduits to the turbine inlet valves 24 as indicated by the reference character 38A. Since the steam produced by the reactor 16 is used directly for turbine energization, the plant operation is characterized as being of the single or direct cycle type.

Generally, it is necessary to hold the reactor vessle pressure within a relatively narrow range because the vessel pressure affects the reactivity rate and the reactor power operating level, i.e., the power level varies directly with the reactor pressure. Accordingly, it is necessary that the turbine throttle pressure be held within a relatively narrow range or, if desired and if possible, at the rated value by the imposition of throttle pressure control on the turbine inlet vlave operation. Since turbine load is propertional to turbine steam flow or the ratio of impulse chamber pressure to throttle pressure (with the throttle steam at substantially constant pressure and temperature), turbine inlet valve control cannot satisfy load demand changes in the steady state unless changes are made in the steam generation rate at the steam source.

To enable turbine steam flow changes to be made to satisfy turbine and plant loading demand within the throttle pressure operating range, the reactor power operating level is changed as by changing the reactor core recirculation flow through controlled operation of centrifugal pumps 38 and 40 in recirculation flow loops 42 and 44. Jet pumps (not shown) can be used within the reactor vessel to produce a drive flow which forces coolant recirculation through and about the fuel core.

When it is desired to increase reactor power, steam void accumulation is reduced by increasing recirculation flow. Reduced reactor power requires reduced recirculation flow. Typically, recirculation flow control can be used to vary reactor power over a range as high as 25% or more.

Larger power changes require positiion changes in conventional control rods 46 to vary the amount of neutron absorption. Manual or possible automatic control rod placement would normally also be subject to implementation of a core burnup management program.

A conventional reactor control system designated by block 48 is provided for determining the operation of the recirculation flow system and the operation of the control rods 46. Feedback signals or data are applied to the reactor control system 48 from predetermined reactor system detectors and manually or automatically operated analog controllers or other suitable control means in the reactor control system 48 generate outputs which correctively operate the recirculation flow pumps 38 and 40, drives 50 for the control rods 46 and other reactor system controlled devices.

In the recirculation flow control system, conventional coolant flow detectors (not shown) can be used to determine the flows in the loops 42 and 44 for feedback comparison to a computer determined recirculation flow setpoint FSP. Similarly, suitable position detectors generate control rod position feedback signals for comparison with control position setpoints RSP which are determined in accordance with the externally determined core management program and, if desired, in accordance with any demand for reactor power change in excess of the recirculation flow control range. In this case, automatically operated pump controllers vary the speed of the recirculation pump drives for flow correction and manually operated rod drive controllers are used to operate the rod drives to satisfy the rod position setpoints RSP. When the recirculation system is either at its maximum flow limit or at its minimum flow limit, which can be determined by pump speed for example, conventional contacts can be closed or opened or other suitable indicating signals provided for the rubine control system, as hereinafter described.

Positioning of the respective turbine throttle and governor inlet valves is effected by operation of respective conventional hydraulic actuators 52 under the control of respective electrohydraulic position control 54. Respective inlet valve position demand setpoint signals ISP are applied to the respective controls 54 under programmed computer control. Respective inlet valve position feedback signals PDIV are generated by respective linear differential transformer or other position detectors. Position error for any of the inlet valves 24 results in operation of the associated valve actuator 52 until the error is removed and the valve position demand ISP is satisfied.

Similarly, hydraulic bypass valve actuators 56 and electrohydraulic bypass valve position control 58 operate the bypass valves 32 to satisfy respective bypass valve position demand setpoint signals BSP which are determined by programmed computer operation. The bypass valves 32 provide for diverting steam not needed by the turbine 14 such as during startup and shutdown and during load control when load rejection conditions are imposed on the power plant 10. Bypass valve position feedback signals PDBV are generated by conventional position detectors for comparison to the individual setpoint signals BSP.

Each of the electrohydraulic position controls 54 or 58 includes a conventional analog controller (not indicated) which drives a suitable known actuator servo valve (not indicated) in the well known manner. In turn, the respective servo valves determine the operation of the valve actuators 52 and 56.

The reheat valve 28 are also controlled by a suitable hydraulically operated actuatro (not indicated). A high pressure fluid supply system (not indicated in FIG. 1) provides the controlling fluid for operation of all of the hydraulic valve actuators. A lubricating oil system (not indicated in FIG. 1) is separately provided for turbine and other lubricating requirements. Both the high pressure fluid supply and the lubricating oil system can be placed under computer sequencing, monitoring and supervisory control.

Figure 2:
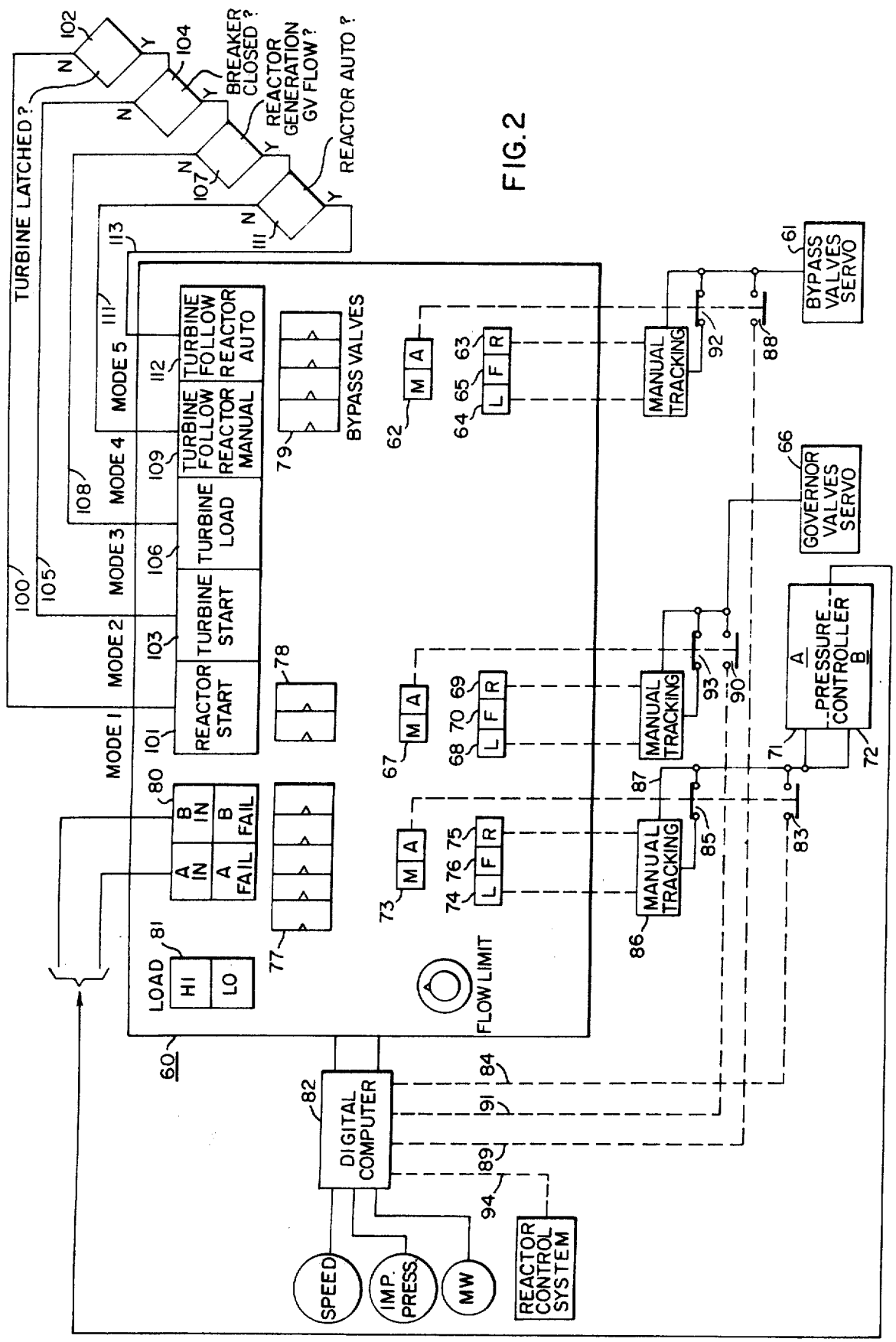
FIG. 2 is a schematic diagram of the control panel of the system and illustrates functionally various operational states of the system.

As illustrated in FIG. 2, a control and indication panel 60 is utilized for operating the boiling water reactor 16 and the steam turbine 14 in both the manual and automatic mode. Associated with each of the bypass valves 32 and its associated actuators 56 and 58 is a bypass valve servo control 61. Manual automatic pushbuttons 62 are operated to control the bypass valves through its servo 61 in either the manual or the automatic mode. When in the manual mode, pushbuttons 63 are operated to raise or open the bypass valves; and pushbutton 64 may be operated to lower or close the bypass valves. Pushbutton 65 when operated either lowers or raises the bypass valves more rapidly than normal. Associated with each of the steam inlet valves 24, which in this described embodiment are governor valves, is a servo controller 66. Pushbutton 67 is provided to manually operate the governor valves through its servo controller 66; and pushbuttons 68, 69 and 70, respectively, are provided to either lower, raise or move the valve at a more rapid rate. Pressure controllers 71 and 72 may also be operated either manually or automatically by operation of the mechanism 73. Similarly, when in manual operation, the pressure in the pressure controllers 71 and 72 may either be lowered, raised or operated at a more rapid rate by the operation of pushbuttons 74, 75 and 76, respectively. Position indicators 77, 78 and 79 are provided for indicating the various operative states of the pressure controllers 71 and 72, the governor valves or steam inlet valves 24 and the bypass valves 32, respectively. Indicator 80 is provided to inform the operator which pressure controller, 71 or 72, is controlling the system and whether or not such pressure controller has failed to function. Indicator 81 is provided to inform the operator whether or not the load is at its high or low limit.

A digital computer structure referred to at block 82 is interfaced with the control and indication panel to provide information and control as more fully described hereinafter. The general organization of such digital computer may be of the type described in copendidng U.S. patent application Ser. No. 247,877 entitled "System And Method For Starting, Synchronizing, And Operating A Steam Turbine With Digital Computer Control" filed by T. Giras et al on Apr. 26, 1972, assigned to the present assignee, and is incorporated herein by reference, as though set forth at length herein. Only those portions of the digital computer control organization that are specific to the present invention are described in detail.

When in manual control, contact 83 closes to connect an output generally referred to by a dashed line 84 from the digital computer 82 to the pressure controllers 71 and 72. Simultaneously, a contact 85 opens to disconnect the manual operation of the system through the panelboard 60, and the condition of the pressure controllers 71 and 72 is tracked by apparatus 86 over line 87 in order that transfer between manual and automatic can be effected bumplessly. A system and organization for transferring between manual and automatic operation bumplessly is disclosed in detail in U.S. patent application Ser. No. 298,081, entitled "Steam Turbine System With Digital Computer Position Control Having Improved Automatic-Manual Interaction" filed Oct. 16, 1972 by Andrew S. Braytenbah, assigned to the present assignee, which application is incorporated herein by reference as though set forth at length herein. Similarly, the operation of the bypass valves is transferred to the digital computer upon closure of contact 88 over dashed line 89; and the operation of the governor valves is transferred to the digital computer 82 upon closure of contact 90 over dashed line 91. Contacts 92 and 93 respectively open to disconnect the operation of the bypass valves and the governor valves from manual control. The reactor control system 48 is indicated as being connected to the digital computer over dashed line 94.

Referring again to the control and indication panel 60, the operation of the reactor turbine system may be in several operating modes. When the turbine is not latched, as indicated by line 100 connecting indicator lamp 101 to decision block 102, "reactor start" is indicated by the indicator 101. In this operating mode, the reactor is operated manually. When the turbine is latched, and the circuit breaker(s) is open, indication lamp 103 is connected to decision block 104 over line 105. When the circuit breaker is closed, and the reactor generation rate does not equal the governor valve flow, indication lamp 106 is connected to decision block 107 over line 108 to indicate a "turbine load" mode of operation. When the reactor generation rate is equal to the governor valve flow, and the reactor is being operated manually, indication lamp 109 is connected to decision block 110 over line 111 to indicate to the operator that the operating mode is in the turbine follow operation with the reactor on manual. When the reactor is placed in automatic operation, the indicator lamp 112 is connected to the decision block 110 over line 113 to indicate that the system is in a turbine follow reactor automatic mode. The various modes of operation are described as mode 1 through mode 5 inclusive. For example "reactor start" is referred to as mode 1, "turbine start" mode is referred to as mode 2, "turbine load" is referred to as mode 3, "turbine follow reactor manual" load is referred to as mode 4, and "turbine follow reactor automatic" is referred to as mode 5 hereinafter.

Figure 3A:
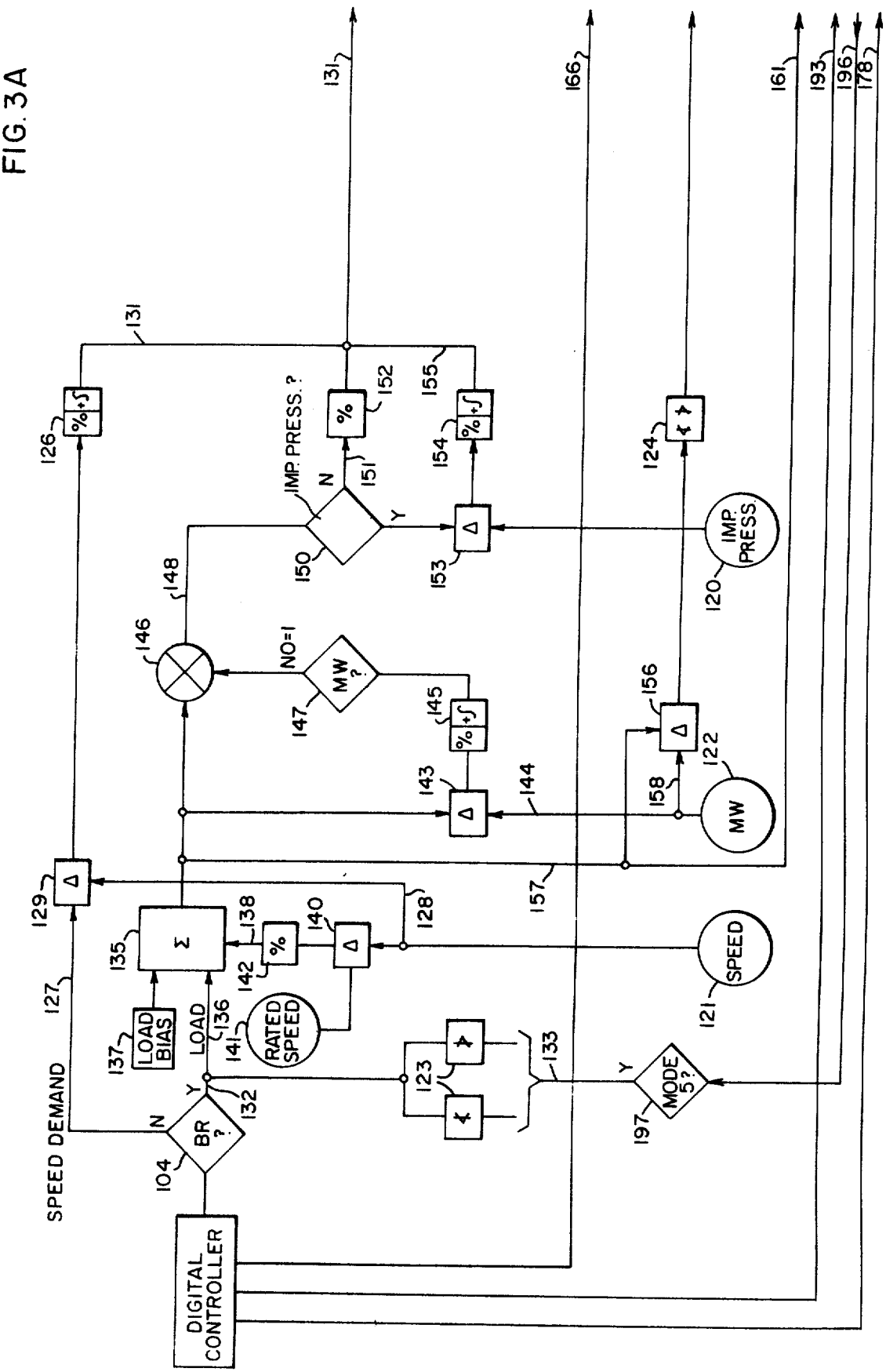
FIGS. 3A and 3B show a schematic diagram of a combination digital and analog system in accordance with the present invention.
Figure 3B:
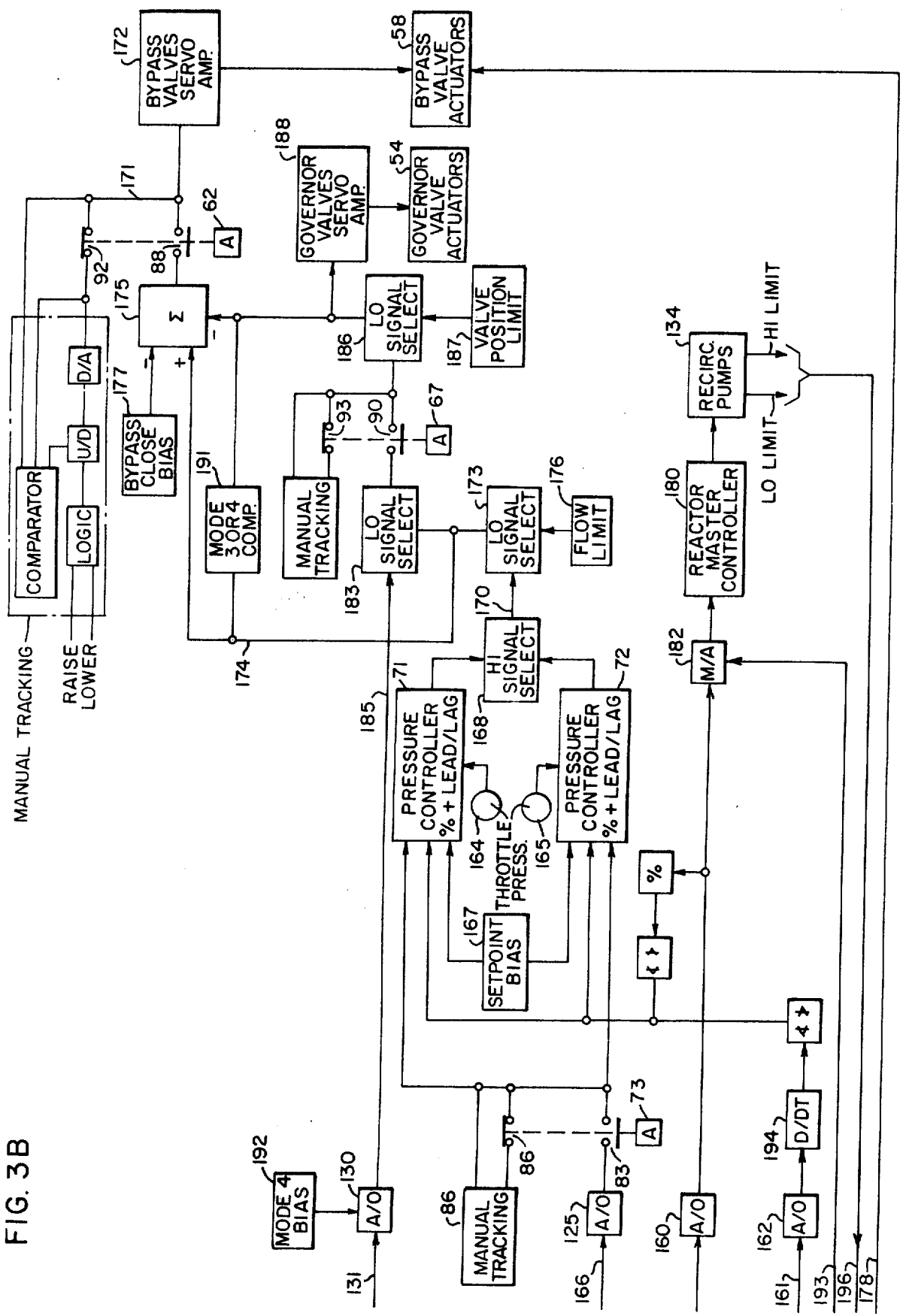

The conditions necessary for placing the system in the previously described operating modes will be described in connection with FIG. 3. FIG. 3A is the digital portion of the system, and is included in the computer organization previously referred to at 82 in FIG. 2. FIG. 3B is the analog portion of the system.

In connection with the digital portion of the system (see FIG. 6) a control task computes governor valve analog outputs to position such valves to achieve the desired speed or load demand when the system is in automatic control. When the system is in manual control, the control task tracks the analog system valve position demand signals in preparation for transfer to automatic control. This control task, in accordance with one embodiment, is assigned a high priority level and is bid by an auxiliary synchronizing task every one-half second. Automatic control requires interacting feedback control system capable of compensating for dynamic conditions in the power system, and the turbine generator. Impulse pressure from transducer 120, shaft speed from transducer 121, and megawatts from the generator from transducer 122, are the feedback normally used to correct for any non-linearities and to stabilize the interactions among these variables. The digital system also contains provisions for high and low load limits represented by box 123 and 124 which can be adjusted from a control panel.

Figure 5:
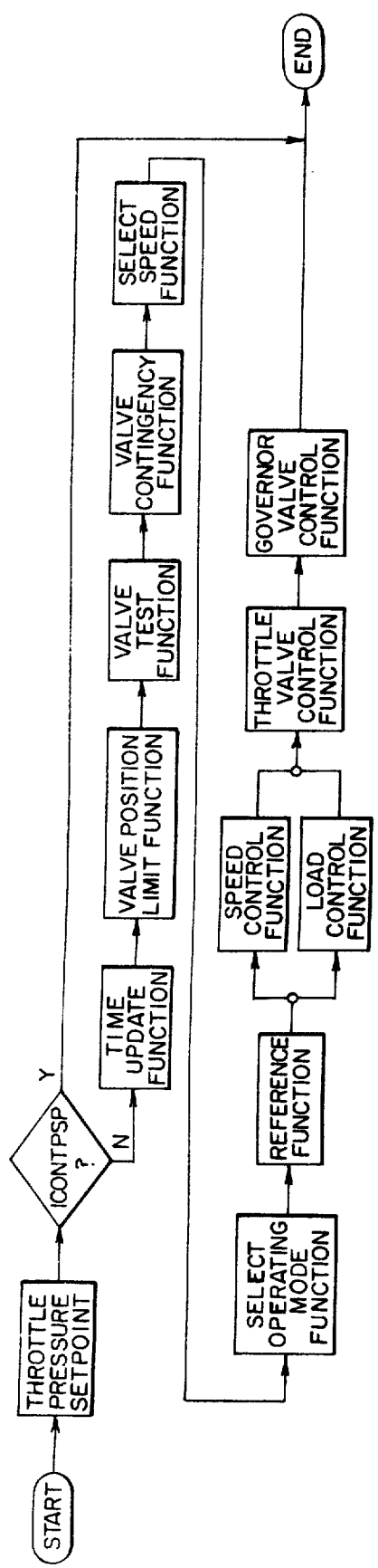
FIG. 5 is a functional flow chart of the throttle pressure setpoint function in the digital portion of the system.
Figure 6:
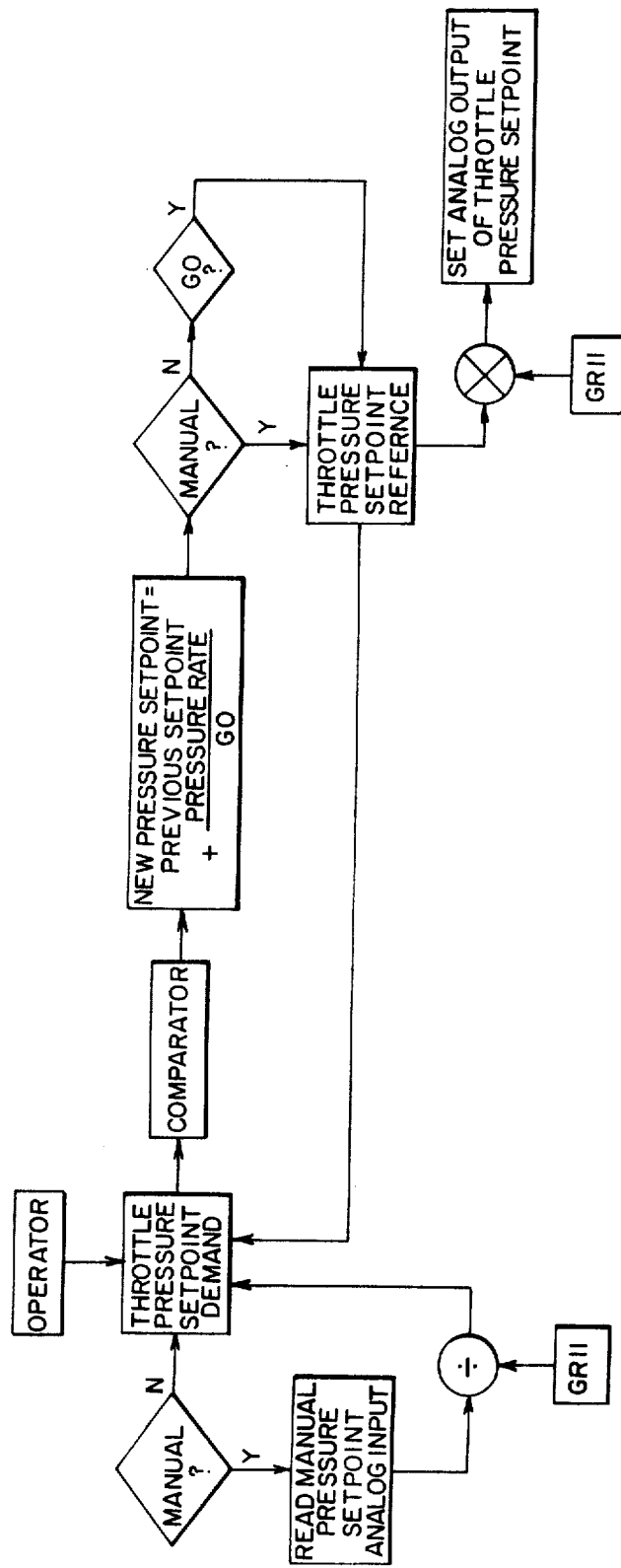
FIG. 6 is a functional flow chart illustrating the control task organization in the digital portion of the system.

The control task as shown in FIG. 6, is organized as a series of relatively short sub-programs, executed sequentially, which address themselves to particular aspects of the general control system objectives. These short sub-programs or function include a throttle pressure setpoint function (see FIG. 5), a valve position limit function, a speed control function, a load control function, and a governor valve control function. The throttle pressure setpoint is computed each half second and the balance of the control task functions are computed each second. To achieve this, a flag ICONTSP is interrogated and set and reset in the auxiliary task. Referring again to FIG. 3, the throttle pressure setpoint function provides an analog output represented by block 125 to the pressure controllers 71 and 72 located in the analog portion of the system. The speed control function positions the governor valves to achieve the existing speed reference with optimum dynamic and steady state response by using a proportional plus reset controller 126. The speed error between the turbine speed reference on line 127 and actual speed from the transducer 121 over line 128 is obtained from comparator 129 to drive the controller 126 to the analog output box 130 over line 131.

When the circuit breaker denoted by the decision block 104, is closed the speed demand signal from the DEH controller becomes a load demand signal on line 132. The limiters 123 are connected by line 133 from reactor circulation pumps denoted by block 134 to prevent a load demand signal which is in excess of the high limit of the reactor recirculation system or below the low limit of the reactor's recirculation system for reasons described in more detail hereinafter.

The load demand signal is output to a summing junction 135 over line 136. This summing junction includes a load bias referred to as 137 to insure that an increase in load demand, while in mode 5, continues to provide control of the governor valves by the pressure regulator 71 and 72. Speed error is also output to the summing junction 135 over line 138. The speed error is determined by comparing in block 140 rated speed referred to at 141 and the actual speed from the transducer 121. The compared speed is then input to a proportional controller 142 to provide an output on line 138 which is a predetermined portion of the input from the comparator 140. The output of the summing device or junction 135 is compensated with two feedback trim factors to account for frequency (speed) participation and megawatt mismatch.

When the megawatt loop is in service, the output of the summing junction 135 is compared by a comparator 143, and the actual megawatts from the transducer 122 over line 144. The output of the comparator 143 is input to a proportional plus reset controller 145, the output of which is multiplied by the output of the summing junction by device 146. If the megawatt loop is out of service as denoted by decision block 147 the factor to the multiplier is one, thus making the output of the multiplier 146 equal to the input.

The load reference, which is corrected for speed error, as previously described, and megawatt error if the loop is in service, becomes the setpoint or flow demand for the governor valves on line 148. If the impulse pressure feedback loop is not in service as referenced by decision block 150, the flow demand is output on line 151 through a proportional controller 152 to the analog output 130. If the impulse pressure loop is in service, then the flow demand signal from line 148 is compared by comparator 153 with the impulse pressure from the transducer 120. The output of the comparator 153 is connected to a proportional plus reset controller 154 to drive the impulse pressurer to zero on line 155 which is input to the analog output 130. High and low limits restrict the range of variation of the controller 154 to eliminate the possibility to reset windup.

The output of the summing junction 135 is also compared by comparator 156 connected by line 157 with the megawatt transducer 122 by way of line 158 to produce a megawatt compensated load demand signal for input to an analog output 160 through the limiter 124. The output of the summing junction is also connected by way of line 157 and 161 to the input of analog output 162. The analog output 160 controls the reactor circulation system including the reactor circulation pumps 134 of the analog system to be described hereinafter. The analog output 162 adjusts the pressure setpoint to the throttle pressure controllers as described hereinafter.

The analog portion of the system, which interfaces with the previously described digital portion is interfaced through the analog output devices 130, 125, 160 and 162. The analog system includes the two analog pressure controllers 71 and 72 with separate pressure transducers 164 and 165. The pressure setpoint is adjustable either in automatic or manual from the control and indication panel as previously mentioned in connection with FIG. 2. When in automatic control, the pressure setpoint is applied to the pressure controllers 71 and 72 over line 166 coming from the digital controller, through the analog output 125 and the closed contact 83. When the pressure setpoint is adjusted manually, the contact 85 at the output of the manual tracking block 86 is closed to adjust the setpoint from the control panel of FIG. 2. A setpoint bias 167 determines which pressure controller 71 or 72 is in control. The other controller acts as a backup controller. A high signal selector 168 permits the signal from the pressure controller in control, depending upon the setpoint bias, to pass to output line 170.

The function of the analog portion of the system and its cooperation with the previously described digital portion of the system will be described in connection with the various operating modes from mode 1 through mode 5 in both the manual and automatic modes of operation. First, when the turbine is not latched, the "reactor start" mode 1 indicator on the panel of FIG. 2 is lit. When the turbine is on turning gear and the condenser vacuum is of a predetermined amount, the bypass valves can be positioned manually with the contact 92 closed by way of line 171 and bypass valve servo amplifier 172. The bypass valves can also be positioned from the output of the pressure controllers 71 or 72 through a low signal select device 173, line 174, summing device 175, the closed contact 88, and the bypass valve servo amplifier 172.

The low signal selector 173 is provided to insure that the steam flow does not exceed a flow limit as determined by limiting device 176. A bypass valve close bias referred to at block 177 is provided as an input to the summing device 175 to insure that the bypass valves are closed when no signal is present on line 174. A contact closure output is provided on line 178 from the digital controller to energize a solenoid valve (not shown) on the bypass valve actuator 58 to energize the solenoid valve when the load is less than 25%. The solenoid valve normally isolates the actuator from the emergency trip header when energized, and permits the actuator to be operated to open the bypass valve even though the turbine may be tripped. When the solenoid valve is energized, the bypass valve trips open in the event of contingencies.

In mode 1, the reactor may be started manually by operation of the control rods and the recirculation system via the reactor master controller 180 and the manual automatic controller 182 in its manual position. When the pressure setpoint is at 150 psi and the actual reactor pressure is less than this value, or when the manual and automatic signals for the bypass are equal, the automatic bypass valve control can be selected on the control panel. Should the reactor pressure be above 150 psi prior to automatic operation of the bypass valves it is necessary to adjust the pressure to obtain a setpoint to a value near the actual pressure so that a null position is existent on the bypass valve tracking meter. Should the digital controller stop, the pressure setpoint control automatically rejects to manual at the existing setpoint by the opening of contact 88 and the closing of contact 92. Failure of both pressure transducers 71 and 72 automatically causes the contact 88 to open and the contact 92 to close in a manner hereinafter described in connection with the detailed operation of the pressure failure control system portion of the analog control. In mode 1, the reactor pressure can be increased from 0 to 1000 psig with pressure control on the bypass valves above.

When the turbine is latched and the breaker is open, (see FIG. 2), the "turbine start" or mode 2 on the control panel is lit. Prior to entering this mode, the reactor pressure and steam generation state must be of a sufficient level to permit roll off of the turning gear of the turbine. When the turbine is latched, the turbine stop valves, interceptor valves, and reheat stop valves, (not shown) open, and the governor valves stay in the closed position. The operator selects a reference for speed and an acceleration rate utilizing the appropriate pushbuttons on the digital control panel (not shown). The turbine governor valves are controlled by the output of the pressure controllers 71 or 72, or the analog output of the digital system, as determined by the low select circuit 183. Thus, as long as the output of the pressure controller 71 or 72 is higher than the speed demand, the starting up of the turbine is controlled by the digital system over the line 127, the comparator 129, the proportional plus reset controller 126, line 131, analog output 130, and line 185 to the low signal select circuit 183. Normally, for wide range speed control, the speed generation of the reactor is sufficiently high so that the output of the pressure controllers 71 or 72 is higher than the speed control signal from the analog output 130 of the digital system. This permits speed control of the turbine while pressure control is maintained on the bypass valves by way of the pressure controller as previously described.

In mode 2 the reactor remains under manual control of the operator by way of the manual/automatic station 182. The output of the low signal selector 183 goes through closed contact 90 of the automatic control for the governor valves, a low signal select 186 which insures that such signal will not exceed the valve position limit referred to at 187 to the governor valve servo lamp 188. The output of the low signal select 186 is also connected to the input of the summing device 175 to the bypass valve servo amplifier 172 over line 190. The input from line 190 to the summing device 175 is of opposite polarity to the bypass control from line 174 which tends to cancel out the effect of the bypass valve signal when in the mode 1 position such that the bypass valve closes as the governor valve servo amp opens the governor valves. If the speed demand signal from line 185 is too high for the generation rate and pressure of the reactor, which is an abnormal situation, the governor valves would open as the steam generation rate is increased regardless of the speed demand signal. If the digital controller should fail while in mode 2, the contact 90, and the contact 88 opens to transfer the operation of the valves to manual and leave such valves in the same position prior to the digital computer failure.

When the main generator breaker is first closed, which is referenced by the decision block 104, the "turbine load" or mode 3 indicator on the control panel is lit. A permissive is included in the circuit breaker logic to prevent the closure of the breaker until the steam generation level of the reactor is above a predetermined amount, such as 15%, for example. This permissive (not shown) insures that control of the pressure remains on the bypass valve over line 174 when the initial load is added at breaker closure. On breaker closure, the digital system reference becomes a load reference on line 132 from decision block 104. When operating in mode 3, the impulse chamber pressure and/or the megawatt feedback loop, previously described, may be placed in operation. As the operator increases the load demand signal, a point is reached in which the steam generation level of the reactor satisfies the governor valve flow. As the governor valves are opened by the increase in load reference over line 185, the bypass valves are closed by a summation of the output of the pressure controller over line 174, governor valve position signal over line 190, and the closing bias 177.

When the governor valve position signal on line 190 is equal to the pressure controller signal on 174, a comparator 191 detects this condition and initiates a transfer to mode 4, or "turbine follow reactor manual". The valve position limit control 187 is provided to limit the total travel of the governor valves in mode 3. If the governor valve position signal at the output of the low signal selector 186 is limited by the valve position limit, the bypass valves are opened correspondingly due to the summation of the pressure controller signal on line 174 and the limit of the valve position signal on line 190.

If the digital system becomes inoperative in mode 3, governor valve control is transferred to manual control by the automatic closing of the contact 93 and the opening of the contact 90. The pressure controllers 71 and 72 maintain pressure in the reactor by positioning the bypass valves over line 174 as long as the bypass valves remain in the automatic mode.

When the operating point at which the bypass valves are just closed is reached, as determined by the comparator 191, the mode 4 indicator on the control panel is lit. The comparator 191 also initiates logic which applies a bias referred to as 137 at the input of the summation junction 135, in the digital system, which insures that the pressure controller signal instead of the compensated load demand signal on line 185 passes through the low signal selector 183 to control the governor valves in this mode.

The bypass valves continue to remain closed, unless the governor valve position signal on line 190 does not follow the pressure controller signal on line 174. Since these two signals are summed as an input to the summing device 175, the bypass valves remain closed as long as the pressure controller signal on line 174 is greater than the sum of the governor valve position signal on line 190 and the bypass valve closing bias 177. In mode 4, the reactor is still in manual control; and plant load can be increased at this time by manually increasing the reactor generation level either with the recirculation control or rod control. An increase in steam generation rate in mode 4 causes the pressure to rise and open the governor control valves through the proportional range of the pressure controllers 71 or 72. As the reactor power level is increased in mode 4, the load demand from the digital system on line 185 should be increased in order to keep the analog output from the low signal selector 183 responsive to the pressure controller output, thus causing the pressure controller output to position the governor valves. If the load demand signal on line 185 is not increased in mode 4 as the power level is increased, the bypass valves open to control pressure, as the governor valves are limited by the load demand signal on 185 which passes through the low signal selector 183. When the bypass valves do open to control pressure the comparator 191 transfers the operation to mode 3 thus, removing the bias 137 from the summing junction 135 and lighting the indicator light on the control panel for mode 3.

When the transfer is initiated from mode 3 to mode 4 by action of the comparator 191, the feedback control loops of megawatts and impulse pressure are removed from the digital portion of the system. If the digital system becomes inoperative when operating in mode 4, the governor valves remain in automatic control from the output of the pressure controller 71 or 72 through the low signal selector 183, the closed contact 90 and the low signal selector 186. However, control of the pressure setpoint on line 166 is transferred to manual operation. If both pressure transducers 71 and 72 fail while operating in mode 4, both governor and bypass valve control are automatically transferred to manual by the opening and closing of the contacts 90 and 93, and 88 and 92 respectively. Also, when the digital system becomes inoperable in mode 4, a bias such as referred to at block 192, is applied to the analog output 130 to maintain the pressure controller signal at the output of the low signal select circuit in control of the governor valves.

The flow limit is adjustable on the control panel (see FIG. 2) from 90 to 130%, for example, reactor flow. The low signal selector 173 determines the lower of such flow limit adjustment, and the pressure controller signal on line 170 from the high signal selector 168 determines the limiting opening and the governor or bypass valves.

When the system is operating in mode 4 and the governor and bypass valves are in automatic control, and a permissive signal is transmitted from the digital system over the line 193, for example, to the manual automatic reactor controller 182, the turbine follow reactor automatic indicator on the panel of FIG. 2 is lit. When in mode 4, it is possible to adjust the load demand in order to zero the load demand error signal on the line 157 to facilitate the transfer to mode 5. In transferring to mode 5, the reactor control system must be in balance between the load demand error furnished on line 157 from the digital system and the manual automatic station 182.

When in mode 5, the governor valves through the governor valve servo amplifier 188 and the governor valve actuator 54 are under the control of the pressure controller 71 or 72. The load demand is used to generate a load demand error signal on the line 157 by comparison with actual megawatts at the comparator 156 of the digital system as an analog output to block 160 to the manual automatic controller 182 for operating the reactor master controller 180 in the automatic mode. As the operator increases the load demand while in mode 5, the load demand error signal acts to increase the reactor circulation control by way of the reactor master controller 180 which controls the reactor recirculation pumps referred to at block 134. This increase in the power level of the reactor causes the pressure controller 71 or 72 to open the governor control valves and pick up the turbine generator load until a balance is again established between actual megawatts and the load demand.

Also, in mode 5, operational changes in the load demand signal effect the analog output block 162 to adjust the setpoint of the pressure controllers 71 and 72 by a derivative circuit 194. This repositions the governor valves in anticipation of an increase load and steam flow.

If the reactor manual automatic station 182 reverts to manual while in mode 5, the digital system reverts to mode 4, with the governor valves being controlled by the pressure controllers 71 or 72. If the digital system becomes inoperable while in mode 5, the system reverts to mode 4 with the governor valves being operated by the pressure controllers 71 or 72. Also, the governor valves or the bypass valves transfer to manual control if the reactor permissive is removed while in mode 5. This action transfers the system to mode 4, with manual control of the governor and/or bypass valves. The bypass close bias 177 insures that while operating in mode 5, transient changes in mode which might cause the bypass valves to open do not transfer the system out of mode 5. If the overall digital system is removed from reactor automatic control (mode 5) the system transfers to mode 4.

As previously mentioned the load output of a boiling water reactor is a function of control rod position and the recirculation flow. The recirculation flow has a range in excess of approximately 25%. When both the turbine and the reactor are in automatic control or mode 5, a load demand for the turbine control is compared with the megawatt output of the generator by the comparator 156 to provide an output through the limiter 124 to the analog output block 160 for controlling the reactor. in addition, as mentioned previously, the load error is used to automatically adjust the pressure setpoint of the pressure controllers 71 or 72 through the analog output block 162. When the recirculation system is at its limit a change of load demand will not result in the desired change of laod level because of the limited range of the recirculation system. Thus, in order to prevent an excessive deviation of throttle pressure and possibly unstable reactor operation, a high and low limit from the reactor circulation system such as from the reactor circulation pumps referred to at block 34 is connected by line 196 through the mode 5 decision block referred to at 197, the line 133 and the limiter 123 to the load demand line 132. This prevents the load demand from exceeding either the high or low limit of the recirculation system when the system is in mode 5 operation by setting the load demand at the high load limit when such load demand would exceed the recirculation limit and setting the load demand at the low load limit when such demand would be outside the low recirculation limit. Thus, the load error which is connected to the reactor control system through the analog output block 160 is not permitted to indicate a load demand error greater than the actual load. When a higher or lower load level for automatic recirculation control range is required, the control rods must be positioned manually.

Figure 4:
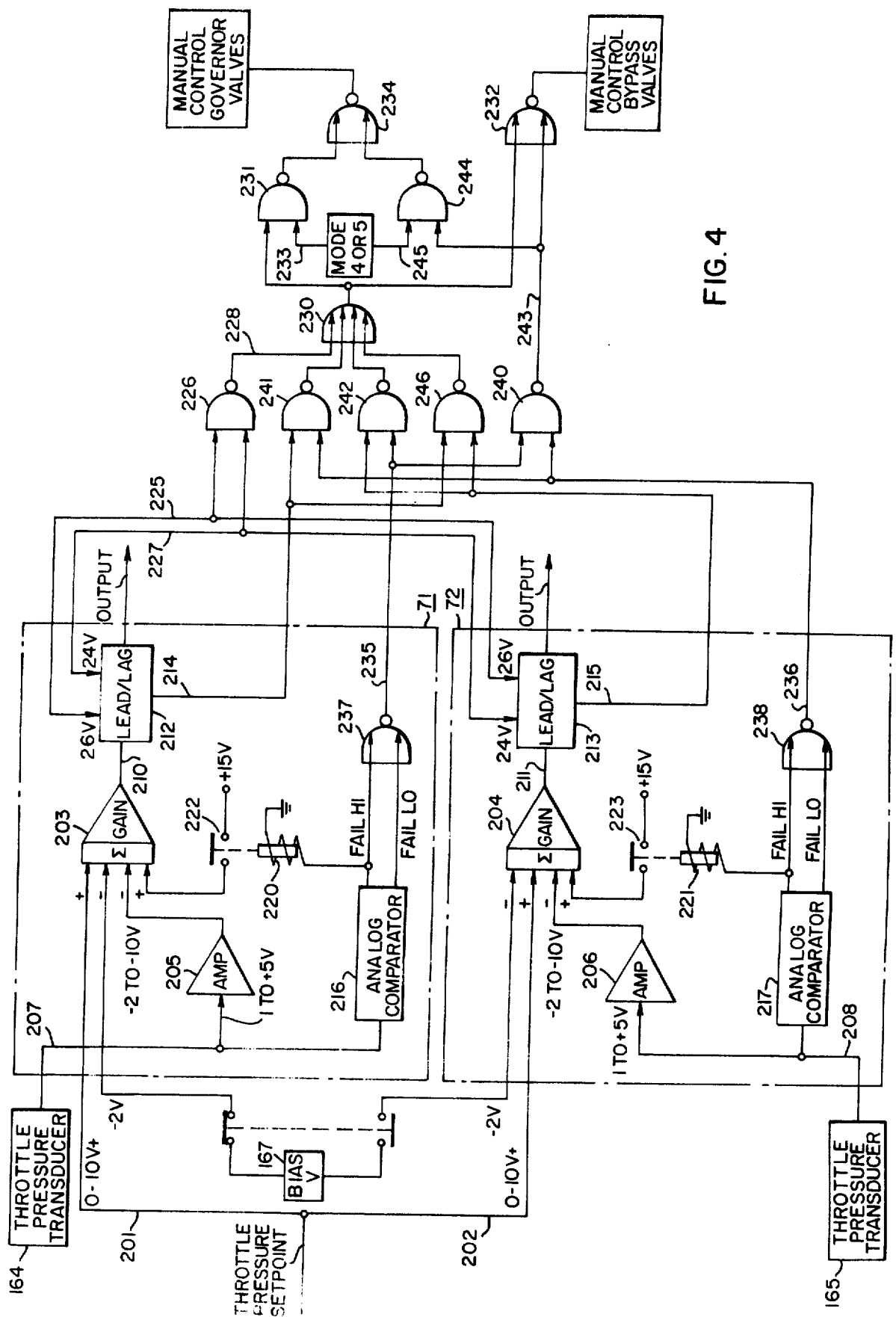
FIG. 4 is a schematic diagram of the circuitry of the throttle pressure controllers and the system for transferring control of the governor valves and bypass valves to manual in the event of certain contingencies.

Referring to FIG. 4, the pressure controllers 71 and 72 each include identical analog circuitry. The throttle pressure transducer 164 is used with the pressure controller 71 and the throttle pressure transducer 165 is used with the controller 72. The throttle pressure setpoint signal is input in parallel over line 201 and 202 to a summing device 203 and 204 for the controllers 71 and 72 respectively. The setpoint signal in one embodiment of the invention varies between 0 and 10 volts positive, which corresponds to a pressure setpoint of 0 to 1200 psi. The summing device 203 and 204 each has a gain G connected therewith. The bias signal 67 may be connected in a conventional manner to either the summing device 203 or 204 to apply a predetermined positive bias to the input of either 203 or 204. This positive bias increases the output of one controller over the other to the input of the high signal selector 168 (see FIG. 3) as previously described. Each of the throttle pressure transducers 164 and 165 have an output of from 1 to 5 volts positive to correspond to an actual pressure of 0 to 1200 psi. The output of the throttle pressure transducers are input to amplifiers 205 and 206 over lines 207 and 208 respectively. The output of the amplifiers 206 is inverted so that the input ranges from −2 to −10 volts for input to each of the amplifiers 203 and 204. The throttle pressure transducers 164 and 165 are each biased to have a so called droop, that is, to insure that there is always a signal present at the output of the summing devices 203 and 204 in a steady state condition. When the signal on the output of summing devices 203 and 204 is negative, the valves move toward an open position; and when the signal is positive the valves move toward a closed position. Assuming a gain of 10 for each of the summing devices 203 and 204, a throttle pressure setpoint of 5 volts for example results in a positive 50 volt output on lines 210 and 211. However, the throttle pressure transducers 164 and 165 are each supplying a negative voltage of 2 volts to the input of the summing devices thus giving a net voltage output of a positive 30 volts which tend to keep the valves closed. As the throttle pressure increases the negative voltage increases on lines 210 and 211 and the valves will remain in the same position until the actual throttle pressure equals the throttle pressure setpoint which would correspond to an input of −6 volts with a resulting negative 10 volts on the outputs 210 and 211; and open the valves to a point corresponding to a 10% negative signal. If the generation rate of the reactor should be such that the pressure continues to increase, the negative signal on lines 210 and 211 would correspondingly increase, thus opening the valves further. if the generation rate of the reactor were such that the throttle pressure actually decreased from the throttle pressure setpoint, the signal would become positive tending to close the valve. The output of each of the summing devices 203 and 204 is connected to a lead lag circuit card 212 and 213 respectively. The characteristics of the lead lag card, which form no part of the present invention include the provision of two individual power sources for each of the cards 212 and 213. One of the power sources for each of the lead lag cards is 24 volts and the other power source is 26 volts. Only one of the sources is required, as the lead lag card is provided with conventional power auctioning. Also, each of the cards provides a logical signal on line 214 and 215 indicating that it has an "on card" power failure. For a more detailed understanding of a lead/lag circuit of the type mentioned, reference is made to U.S. patent application Ser. No. 269,000, filed by James T. Carleton on July 7, 1972, entitled "Compensation Apparatus and Method" and assigned to the present assignee.

Connected to the output of the throttle pressure transducer 164 is conventional analog comparator 216, and connected to the output of the transducer 165 is an analog comparator 217. Each of these analog comparators provides a logic signal in the event that the pressure transducer should exceed a certain value; and another logic signal in the event that the pressure transducer should be below a certain value. Thus, the analog comparators 216 and 217 provide a fail high and a fail low output for each respective transducer.

As mentioned previously, a bias signal is applied to one or the other controllers so that one controller is in control, and the other in standby as dictated by the input to the high signal selector 168 (see FIG. 3). The failure of a throttle pressure transducer in a direction that causes the output of the associated controller to be lower than normal transfers control to the other transducer, because it then has a higher output signal relative to the failed controller for input to the high signal selector 168 provided that such failure is sufficient to make such signal lower than the other. If the throttle pressure transducer should fail in a direction that causes the output level of its controller, to be higher than normal the valves, would tend to "close" and such controller with its associated failed transducer could continue in control. However, with the benefit of the present invention, relays 220 and 221 are normally energized by the analog comparators 216 and 217, respectively, when the associated throttle pressure transducers 164 and 165 are operating properly. Upon failure, of one transducer either in a high or a low direction, the associated relay 220 or 221 is deenergized, thus closing the respective contact 222 or 223, to apply a positive voltage of 15 volts, for example, to the input of the associated summing device 203 or 204. The application of this positive voltage, insures that the output of the non-failed controller is higher than the failed controller, if the failure is in a direction that tends to raise the controller output level, regardless of the direction of transducer failure.

From the foregoing description each of the pressure controllers 71 and 72 includes a number of other components which are subject to failure in addition to the associated throttle pressure transducers 164 and 165; namely, the summing devices 203 and 204, the lead lag circuits 212 and 213, and the power supplies on lines 225 and 227 for the lead lag circuits 212 and 213. Should the 26 volt power supply fail, wire 225 is deenergized which removes energy from a NAND gate 226, which of course results in nothing more than the other pressure controller taking over control. However, if the 24 volt power supply should also fail, wire 227 is deenergized which causes the gate 226 to conduct, which provides a signal on line 228 through OR gate 230 to the input of NAND gates 231 and OR gate 232 to transfer control of the bypass valves to manual. A failure of any of the components except the pressure transducers in one of the controllers is assumed to lower or remove the output signal, so that the high signal selector passes the output of the non-failed controller. If the system is in mode 4 or mode 5, wire 233 is deenergized and an output is provided through the NAND gate 231 to OR gate 234 for shifting control of the governor valves to manual. The shifting of the valve controls to manual operation may be in accordance with the previously referred to U.S. patent application Ser. No. 298,081 incorporated herein by reference.

In the event that both throttle pressure transducers should fail either in the high or low direction, an output signal appears on lines 235 or 236 from OR gates 237 and 238. The failure of transducer 265 merely deenergizes an input to NAND gate 240 and 241 which has no effect on the system. Similarly, if only transducer 164 fails the input on line 235 is removed from NAND gate 242 and 240, which has no effect on the system. However, if both transducers fail, NAND gate 240 provides a signal on line 243 through the OR gate 232 for manual control of the bypass valves, and to NAND gate 244 for transferring to manual control of the governor valves when input 245 is deenergized denoting that the system is in either mode 4 or mode 5. If the lead lag circuit 212 should fail, the line 214 is deenergized which leads to NAND gates 241 and 246. if the lead lag circuit 213 fails, energy is removed from the line 215 to NAND gates 246 and 241. Thus, if both lead lag circuits fail, NAND gate 246 conducts to transfer control of the bypass and governor valves as previously described to manual. If the transducer 165 fails and the lead lag circuit 212 fails the NAND gate 241 conducts to place the valves on manual control. Thus, from the foregoing it is seen that any combination of failures which would effect both transducers will transfer to manual control, the governor valves depending upon the mode of operation, and the bypass valves, regardless of the mode of operation. At the same time, a failure which would tend to produce a high output is converted to a failure that would tend to produce a low controller output, to provide for safe operation and transfer to the other controller when only one of the transducers or components has failed.

The foregoing description has been presented only to illustrate the principles of the invention. Accordingly, it is desired that the invention be not limited to the particular digital and analog embodiment described but rather it be accorded an interpretation consistent with the spirit and scope of its broad principles.

```
CJOB  W7035,05     F,LARDI     DEW,BWR
E
C
C********************************************************************
C
C              COMPUTER STOP . INITIALIZE TASK
C
C********************************************************************
C
       COMMON/ALPHA/CCI(48)
       LOGICAL CCI,MODE4
       EQUIVALENCE (CCI(24),MODE4)
C
C
       COMMON/TACOMCCI/TACCI(28)
       LOGICAL TACCI
C
C
       COMMON/BETA/IBETA(54)
       EQUIVALENCE (IBETA(2),IPBX),(IBETA(30),NOMINS),
      1            (IBETA(33),ICOUNTER3)
C
C
       COMMON/DELTA/XDELTA(100)
       EQUIVALENCE (XDELTA(69),PBRCCI)
       EQUIVALENCE (XDELTA(1),ODMDMAX)
       EQUIVALENCE (XDELTA(5),HLEMAX),(XDELTA(83),BIAS)
C
C
       COMMON/EPSILON/XEPS(50)
       EQUIVALENCE (XEPS(1),ODMD),(XEPS(5),HLL)
       EQUIVALENCE (XEPS(13),REFDMD)
C
C
       COMMON/ZETA/IZETA(80)
       LOGICAL IZETA,TRCOM,RUNLOGIC
       EQUIVALENCE (IZETA(54),TRCOM),(IZETA(59),RUNLOGIC)
C
C
       COMMON/ETA/IETA(32)
```

```
      LOGICAL IETA
C
C
      COMMON/THETA/ITHETA(30)
      LOGICAL ITHETA,CRESETPB,OAPB
      EQUIVALENCE (ITHETA(5),CRESETPB),(ITHETA(7),OAPB)
C
C
         COMMON /AODATA/IPAT(2),IREG(2),MAS(2)
C
C
      COMMON /KAPPA/IKAPPA(66)
      LOGICAL IKAPPA,STPPVLVS
      EQUIVALENCE (IKAPPA(48),STPPVLVS)
C
      COMMON /IMCCI/ICCPAT(6)
C
C
C     AN1 SET UP FLAG  PFASET (LOCATION  00C8)
      COMMON/C8/IC8
C
C     LOCATIONS 60C,60D,60E, VARIABLES: PANEF,PIFLG,PLVAL
      COMMON/ANITB1/IPANIF,IPIFLG,IPLVAL
C
C     LOCATIONS 6A0-6A8, ACCUMULATION BUFFER  P:ACCBUF(9)
      COMMON /ANITB6/INBUF2(9)
C
C     LOCATIONS 694-69A = LAST OFFSET CALCULATION  P:RSBUFF(7)
      COMMON /ANITB2/INBUF1(7)
C
C     LOCATION 06BF  VARIABLE: P:EPANCT
      COMMON/ANITB3/ISPANCT
C
C     LOCATION 06D3  VARIABLE: P:SVF   OUT OF SERVICE FLAG
      COMMON/ANITB4/ISVF
C
C     LOCATION 069B VARIABLE: P:SPANB LAST SPAN CALCULATION
      COMMON/ANITB5/ISPANB
C
C     LOCATION IN THE E,I, TRANSFER TABLE FOR SEQ, OF EVENTS INTERRUPT
      COMMON//INTBSI

C
      DATA MASK/#FFFE/
      DATA IFFFC/#FFFC/
C
C     ISIABLE IS THE ORIGIN OF THE SEQ, OF EVENTS INTERRUPT PROGRAM
      DATA ISIABLE/#0020/
C
C
C                RESET ALL CCO'S
C
      DO 20 I=1,16
      CALL MICCO(1,0,I,MASK)
20    CONTINUE
C
C                RESET COUNTERS AND LOGICAL STATES
C
      DO 100 I=1,80
      IF (I.GT.54) GO TO 70
      IF (I.GT.42) GO TO 60
      IF (I.GT.32) GO TO 50
      IF (I.GT.28) GO TO 40
      IF (I.GT.6)  GO TO 30
      IF (I.GT.4) GO TO 25
      ICCPAT(I) =0
25    IKAPPA(I)=.FALSE.
30    TACCI(I) =.FALSE.
40    IETA(I)  =.FALSE.
      ITHETA(I)=.FALSE.
50    CCI(I)   =.FALSE.
60    IBETA(I) = 0
70    IZETA(I) =.FALSE.
100   CONTINUE
C
      IF(STOPVLVS) TRCOM = .TRUE.
C
C                SET BETA COUNTERS
C
      IPBX=1
      NOMINS=1
      ICOUNTER3=5
```

```
C              INITIALIZE GV DEMAND A/O                    INBUF1(I)=0
C                                                     150  INBUF2(I)=0
        CALL MICCO(1,2047,IREG,MASK)                  200  CONTINUE
C                                                          LDA      =0
C                                                          IOA      15
C              RESTORE DIGITAL SPEED CHANNEL          C
C                                                     C              LIGHT CONTROLLER RESET
        LDA  =8553                                         CALL MICCO(1,1,10,1)
        IOA  32                                            CRESETPB=.TRUE.
C
C                                                     C
C              RESET DEMAND CCI SCAN                  C              SCAN PLANT CC's
C                                                     C
        PERCCI=0.                                     1000 CALL PLANTCCI
        INTBSI=ISIABLE                                C
C
C              RESTORE A/I HANDLER                    C              INITIALIZE REFDMD AND DMD
C                                                     C
        IPANIF=0                                           IF(.NOT.CRESETRB) GO TO 2000
        IPIFLG=0                                           IF(.NOT.MODE4) GO TO 2000
        IPLVAL=0                                           REFDMD=DMDMAX=BIAS
        ICB=MASK                                           DMD=REFDMD
        ISRANCT=IFFFC                                      HLL=HLLMAX
        ISVF=0
        ISPANB=0                                      C
        DO 200 I=1,9                                  2000 CALL EXIT
        IF (I .GT. 7) GO TO 150                            GO TO 1000
                                                           END

100  CALL MIIN(N11)
                                            ISCAN=1
                                            IF(.NOT. KEYENTRY) CALL MIIN(N8)
                                            ICONTRSP=.FALSE.
                                            GO TO 2000
                                       C
                                       C              BID ANALOG SCAN AND FLASH TASKS
                                       C       CALL CONTROL PROGRAM TO GET T P SET PT RAMP ONLY
                                       200  IF(.NOT.VIDAROS) CALL MIIN(N13)
                                            CALL MIIN(N5)
                                            IF(ISCAN .EQ. 0) GO TO 210
                                            INTSCAN=INTSCAN+1
                                            IF(INTSCAN .GE. N11) INTSCAN=1
                                       210  IF(ICONTPSP) CALL MIIN(N13)
                                       220  GO TO 2000
                                       C
                                       C              BID ATS TASK
                                       C
                                       300  CALL MIIN(N10)
                                            ISIMAX=SIMAX
                                            IF(ISICOUNT .LT. ISIMAX) GO TO 250
                                            PERCCI=1.
                                       250  PERSCAN=.FALSE.
                                            IF(PERCCI .NE. 0.) PERSCAN=.TRUE.
                                            IF(.NOT. (PERSCAN .EOR. PERSCANX)) GO TO 280
                                            IF(PERSCANX) GO TO 260
                                            INTBSI=ISIDIS
                                            GO TO 270
                                       260  INTBSI=ISIABLE
                                       270  PERSCANX=PERSCAN
                                            RUNLOGIC=.TRUE.
                                       280  ISICOUNT=0
                                            IF(.NOT. PERSCAN) GO TO 2000
                                            CALL MIIN(N15)
                                            GO TO 2000
                                       C
                                       C              BID 5 SECOND TASKS
                                       C
                                       400  CALL MIIN(N3)
                                       2000 CONTINUE
                                       C

CJOB W7035,5 F.LARDI               DEH=BWR
C
C
C              ANALOG SCAN
C
C*****************************************************************
C
C
        COMMON/ALPHA/IALPHA(48)
        EQUIVALENCE(IALPHA(20),TM)
        EQUIVALENCE(IALPHA(44),PRCONTB)
```

```
      EQUIVALENCE(IALPHA(24),MODE4)
      LOGICAL TW,MODE4,ERCONTB
C
C
C     INTEGER AND LOGICAL VARIABLES
C
      COMMON/BETA/IPB,      IPBX,     FLGWRD,   NVTEST,   INDEX1,   INDEX2,
     1            IWINDOW,  KEYENTRY, INDEX3,   DATENTRY, ISPCOUNT, DECPT,
     2            IDPT,     DADR,     IADSUP,   IADSDOWN, ISICOUNT, IYPL,
     3            ITF,      ICC01,    ICC02,    ICOURSE,  IFINE,    IOLDCT,
     4            ISCAN,    NSYNC1,   NSYNC2,   INTSCAN,  IDUTY,    NOMINS,
     5            ICOUNTER(8),        ITIME,    RUNPANEL, TVSCAN,   GVSCAN,
     6            IREFDMD,  RUNSCAN,  IVTPAT1,  IVTPAT2,  IBETA1(11)
C
      INTEGER     IPB,      IPBX,     FLGWRD,   NVTEST,   INDEX1,   INDEX2,
     1            IWINDOW,  INDEX3,   ISPCOUNT, IDPT,     IADSUP,   IADSDOWN,
     2            ISICOUNT, IYPL,     ITF,      ICC01,    ICC02,    ICOURSE,
     3            IFINE,    IOLDCT,   ISCAN,    NSYNC1,   NSYNC2,   INTSCAN,
     4            IDUTY,    NOMINS,   ICOUNTER,           ITIME,    IREFDMD
C
      LOGICAL     KEYENTRY, DATENTRY, DECPT,    DADR,     TVSCAN,   GVSCAN,
     1            RUNPANEL, RUNSCAN
C
C
      COMMON/GAMMA/AI(9),IGAMMA,ITVGV(7),ITVGVSS(12),ITESTAD,
     1             IVSTDISP,ISQVX0(8)
C
      EQUIVALENCE (AI(3),P0)
C

30

C
C     REAL VARIABLES
C
      COMMON/DELTA/BDMDMAX,BARATMAX,BLRATMAX,LLLMAX,HLLMAX,TPRBMAX,
     1             SPDBMINS,SPDBPLUS,TPDMDMAX,XDELTA1,
     1             WR,HMS,HCF,HEC,LEL,GG1,PBMIN,QL2,QL3,WSERROB,
     1             T1,T2,T3,GE1,   CLOSEDB,BTV0,BGV0,BGVC,WSDIP,
     1             MWINIT,XDELTA5,GVSPMIN,VTESTINC,BTVC,
     1             PBREF,WSWITCH,TWS,TMW,TP1,DBTRKL,DBTBKS,
     1             GR1,GR2,GR3,GR4,GR5,GR6,GR7,GR8,GR9,GR10,
     1             TVDB,GVDB,RBRATE,ADSRATE,TPCRATE,XDELTA2,
     1             WSMIN,WSMAX,AIDBMW,XIDBBI,
     1             GR2,T9,QBINIT,GR11,     MWMAX,SIMAX,WSREFMIN,
     1             PERCC1,AISSCAN,TWMANDB,GVMANDB,ADSMAXT,TESTAIMX,
     1             ACHL(8),BVTSTINC,GR12,EQLDSEC,BIAS,REFA0,
     1             SLOPE(5),MWMX,LDSE,BVMAX,PIMIN,ADSCOUNT,BINT(5),
     1             XDELTA6(5)
C
      REAL LEL,LLLMAX,MWINIT,MWMAX,          MWMX,LDSE
C
      DIMENSION AIDB(2)
      EQUIVALENCE (AIDBMW,AIDB(1))
C
C
      COMMON/EPSILON/XEPS(50)
      EQUIVALENCE (XEPS(10),PIXDSP),(XEPS(18),REF1)
C
C
      COMMON/ZETA/IZETA(80)
C
      LOGICAL VIDARBS,RUNLOGIC,AIFAIL(2),AIFAILX(2),VIDARBSX,BR,TRCOM,
     1        MWI,IPI
C
      EQUIVALENCE (IZETA(27),VIDARBS),(IZETA(39),RUNLOGIC),
     1            (IZETA(64),AIFAIL(1)),(IZETA(66),AIFAILX(1)),
     1            (IZETA(68),VIDARBSX),(IZETA(20),BR),
     1            (IZETA(54),TRCOM),
     1 (IZETA(34),MWI),(IZETA(30),IPI)
C
      COMMON/KAPPA/IKAPPA(40)
      EQUIVALENCE (IKAPPA(6),TPXDSK),(IKAPPA(43),STOPVLVS)
```

```
      LOGICAL TRXDOK,STOPVLVS
C
      COMMON/DEWAI/IVALBUF1(11),IVALBUF2(8),IVALBUF3(8)
C
      COMMON/TAAI/ITAAI(95)
C
      COMMON/TAADBUF/IADBUF(95)
C
      INTEGER ADBUF1(11),ADBUF2(8),ADBUF3(8),IA(2)
      INTEGER IPOCONWD(2)
C
C
      LOGICAL BIDATSEV,AIXDFAIL
      BIT MSIGN(1)
C
      EQUIVALENCE (IDUMMY,MSIGN(1))
C
C     CONTENTS ADBUF1  MW,       P1,       PB,       OBCSPD,  SHPSI,   APSP,
C              MRSP,   GV10,     GVCOM,    ITESTAO
      DATA ADBUF1    /#9860,    #DDD0,    #DE80,    #FE40,   #FD80,   #FD10,
     1       #FD20,   #FD00,    #FF90,    #FE70,    #FE70/
C
C     CONTENTS ADBUF2  TV1POS,   TV2POS,   TV3POS,   TV4POS,
C              TVRAN,  TV10,     TVCOM
      DATA ADBUF2    /#FF30,    #FF40,    #FF50,    #FF60,
     1       #FF10,   #FF00,    #FF20,    #F720/
C
C     CONTENTS ADBUF3  GV1POS,   GV2POS,   GV3POS,   GV4POS,
C              BRV1POS,BRV2POS,BRV3POS
      DATA ADBUF3    /#FFA0,    #FFB0,    #FFC0,    #FFD0,
     1       #F500,   #FE10,    #FE20,    #FE20/
C
C
C     POINTERS FOR REF1 AND PIXDSP IN EPSILON COMMON
      DATA IA/1,10/
      DATA MASK/#3FF6/
C     MASKMAX IS THE INTEGER # FROM A/D CONVERTER AT MAX POSITIVE INPUT
      DATA MASKMAX/#094/
C     MASKMIN IS THE INTEGER # FROM A/D CONVERTER AT MAX NEGATIVE INPUT
      DATA MASKMIN/#228/
C             CONTROL WORDS FOR PRESSURE TRANSDUCER A AND B

DATA IPOCONWD/#DE80,#DE80/

C
C
C
C     IF(ISCAN .NE. 0) GO TO 60
C             SCAN CONTROL INPUTS
C
C       SCAN PRESSURE TRANSDUCER OF THE CONTROLLING PRESSURE-CONTROLLER
      ADBUF1(3)=IPOCONWD(1)
      IF(PRCONTB)ADBUF1(3)=IPOCONWD(2)
      CALL MIANI(10,ADBUF1,IVALBUF1,FLGWRD)
      PIXDSP=REF1+GR3
      DO 50 I=1,10
      IDUMMY = IVALBUF1(I)
      IF(I.GT.5) GO TO 50
      AIXDFAIL=.FALSE.
      IF(.NOT. MSIGN(1,13)) GO TO 1
      IDUMMY=0
      AIXDFAIL=.TRUE.
1     TEMP=IDUMMY
      AI(I)=SLOPE(I)*TEMP+BINT(I)
      IF(I-2)6901,6903,6901
6901  IF(AI(I) .GE. 0.) GO TO 3
6902  AI(I)=0.
      GO TO 4
6903  IF(AI(I)+PIMIN) 6902,3,3
3     IF(AI(I) .LT. AIHL(I)) GO TO 6
      AI(I)=AIHL(I)
      AIXDFAIL=.TRUE.
6     IF(I-3)5000,6906,50
6906  TPXDOK=(.NOT. AIXDFAIL)
      GO TO 50
```

```
6.00   AIFAIL(I)=.FALSE.
       IF(AIXDFAIL) GO TO 7
       IF(.NOT. GR) GO TO 8
       J=IA(I)
       IF(MWI .OR. IPI) GO TO 6100
       IF((.NOT.TPXDOK).OR.(RO.LT.POMI)) GO TO 8
       TEMP=PO/POREF

GO TO 6200
6100   TEMP=1,
6200   IF(MODE4) GO TO 8
       TEMP=ABS(TEMP*MEPS(J)+AI(17)
       IF(TEMP .LT. AIDB(I)) GO TO 8
7      AIFAIL(I)=.TRUE.
8      IF(AIFAIL(I) .EOR. AIFAILX(I)) RUNLOGIC=.TRUE.
       GO TO 50
10     IF(I.EQ.10) GO TO 15
       ASSIGN 50 TO NRETURN
       J=I-5
12     IF(MSIGN(1,13))IDUMMY=0
13     IF(IDUMMY .GT. MASKMAX) IDUMMY = MASKMAX
14     ITVGV(J) = IDUMMY
       GO TO NRETURN,(50,740)
15     ASSIGN 16 TO NRETURN
       GO TO 20
16     ITESTAO = IDUMMY
       GO TO 50
20     IF(MSIGN(1,13)) GO TO 22
       IDUMMY = 0
       GO TO 25
S22    LDA  IDUMMY
S      EOR  MASK
S      STA  IDUMMY
       IF(IDUMMY .GT. MASKMAX) IDUMMY = MASKMAX
25     IF(I.EQ.10)GO TO 16
       ITVGVSS(J) = IDUMMY
       GO TO NRETURN,(120,720)
50     CONTINUE
       VIDAROS=.FALSE.
       IF(FLGWRD .LT. 0) VIDAROS=.TRUE.
       IF(VIDAROS .EOR. VIDAROSX) RUNLOGIC=.TRUE.
       VIDAROSX=VIDAROS
       TPXDOK=TPXDOK.AND.(.NOT.VIDAROS)
       IF((.NOT.TRCOM).AND.TM) GO TO 701
       GO TO 1000
60     ISCAN=0
       GO TO (700,100,1000,1600,800,700,100,1000,1000,200) INTSCAN
C
C
C               SCAN GV & BPV POSITIONS            700  IF(STOPVLVS) GO TO 1000
C                                                       IF(.NOT.TRCOM).AND.TM) GO TO 1000
100    CALL MIANI(7, ADBUF3,IVALBUF3,FLGWRD)       701  CALL MIANI(7, ADBUF2,IVALBUF2,FLGWRD)
       DO 120 I=1,7                                     DO 720 I=1,4
       IDUMMY=IVALBUF3(I)                               IDUMMY = IVALBUF2(I)
       J = I + 4                                        J=I
       ASSIGN 120 TO NRETURN                            ASSIGN 720 TO NRETURN
       GO TO 20                                         GO TO 20
120    CONTINUE                                    720  CONTINUE
       GO TO 1000                                       DO 740 I=5,7
C                                                       J=I
C               SPAN AND ADJUST                         IDUMMY = IVALBUF2(I)
C                                                       ASSIGN 740 TO NRETURN
200    ISPAN=ISPAN+1                                    GO TO 12
       IF(ISPAN .LT. 3) GO TO 1000                 740  CONTINUE
       ISPAN=0                                          TVSCAN = .TRUE.
       CALL MISPNADJ                               C
       GO TO 1000                                  1000 CALL EXIT
C                                                       GO TO 5
C      TV POSITIONS AND TV DEMANDS                      END
C

CJOB W7035,5 F.LARDI         DEH-BWR
       C
       C**************************************************************
       C
       C              PROPORTIONAL + RESET CONTROLLER
       C
       C**************************************************************
       C
       C
              SUBROUTINE PRESET(ERR,ERRX,G,TR,HL,XLL,RES,PRES)
       C
       C                    ARGUMENT DEFINITION
```

```
C                   ERR = PRESENT INPUT
C                   ERRX = LAST INPUT
C                      G = PROPORTIONAL GAIN
C                     TR = RESET TIME
C                     HL = HIGH LIMIT
C                    XLL = LOW LIMIT
C                    RES = INTEGRAL OUTPUT
C                   PRES = PROPORTIONAL AND INTEGRAL OUTPUT
C
C
      COMMON/KAPPA/LKAPPA(48)
      EQUIVALENCE (LKAPPA(28),GVATLIM)
      LOGICAL LKAPPA,GVATLIM
C
C
      IF(GVATLIM) GO TO 5
      RES=RES+(ERR+ERRX)/(2.*TR)
    5 ERRX=ERR
      IF(RES.GE.XLL) GO TO 10
      RES=XLL
      GO TO 20
   10 IF(RES.LT.HL) GO TO 20
      RES=HL
   20 PRES=G*ERR+RES
      IF(PRES.GE.XLL) GO TO 30
      PRES=XLL
      GO TO 40
   30 IF(PRES.LT.HL) GO TO 40
      PRES=HL
   40 RETURN
      END $JOB G7035,5     F.LARDI        DEH - BWR
C
C
C***************************************************************************
C
C           MAIN GEN. CIRCUIT BREAKER OPEN INTERRUPT PROGRAM
C
C***************************************************************************
C
      COMMON/AODATA/IPAT(2), IREG(2), MASK(2)
C
      INTEGER NREG(2)
      DATA NREG/28,29/
      DATA N9/#6001/
      DATA N2/#4002/
C
      CALL MICCO(N9,IPAT,IREG,MASK)
      CALL MICCO (N2,IPAT,NREG,MASK)
C
S     JMP         *2#3
      END

2              ADSPULSE, GVATLIM
C
      COMMON/AODATA/IPAT(2),IREG(2),MASK(2)
C
C
      COMMON/ATSCOM/ATSVPLRB,IATSCOM(304)
C
      LOGICAL ATSVPLRB
C
C
      COMMON/TIMECTR/ISEC,IMIN,IHOUR
C
C
C
      LOGICAL LCLOSE,ON,OFF,TRIPX
      BIT FIRSTBIT(1)
      EQUIVALENCE (IPRESREF,FIRSTBIT(1))
      DATA ISHFT/#4001/
      DATA NREGREF/29/
      DATA ON/.TRUE./
      DATA OFF/.FALSE./
      DATA ZERO/0./
C
      FOLAG(ZIN,TDELAY,ZOUT)=(TDELAY*ZOUT+ZIN)/(TDELAY+1.)
C
C
```

```
C     *****************************************************************
C
C            THROTTLE PRESSURE SET POINT
C
C     *****************************************************************
C
2000  IF(.NOT.MRC) GO TO 2005
      IF(ICONTPSP) GO TO 5000
      IRMPSP=IRMPSP+(MPSP-ABSP)
      RMPSP=IRMPSP
      TPDEMAND=RMPSP/GR11
      GO TO 2017
2005  IF(.GOTPRAMP) GO TO 2006
      IF(.NOTPRAMP.AND.(TPDEMAND.EQ.TPREFDMD))GO TO 2015
      GO TO 2040
2006  TEMP = TPDEMAND - TPREFDMD
      IF(TEMP.GT.0.) GO TO 2010
      TEMP=-TEMP
      TPRATE = -TPRATE
2010  TEMP1= TPRATE/120.
      IF(TEMP1.LT.0.)TEMP1=-TEMP1
      IF(TEMP.GT.TEMP1) GO TO 2020
2015  GOHOLDTP=.TRUE.
      RUNLOGIC=.TRUE.
2017  TPREFDMD=TPDEMAND
2030  PRESREF = GR11 * TPREFDMD
      IPRESREF = PRESREF
      IF(IPRESREF.LT.0) IPRESREF=0
      IF(IPRESREF.GT.4094) IPRESREF=4094
      IF(FIRSTBIT(1,1)) GO TO 2031
C                  OPEN LEAST SIGNIFICANT BIT CCO
      CALL MICCO(1,OFF,7,8192)
      GO TO 2032
C                  CLOSE LEAST SIGNIFICANT BIT CCO
2031  CALL MICCO(1,ON,7,8192)
2032  LDQ ISHFT
S     SHF     IPRESREF
C                  OUTPUT TO 16-BIT AO CARD
      CALL MICCO( 1,IPRESREF, 24,MASK)
C     IF TPRATE IS NEGATIVE - RESET TO POSITIVE NUMBER
      IF(TPRATE.LT.0.) TPRATE = -TPRATE
2040  IF(ICONTPSP) GO TO 5000
      ICONTPSP =.TRUE.
      GO TO 5
2020  TPREFDMD = TPREFDMD + TPRATE/120.
      GO TO 2030
C
C     *****************************************************************
C
C         CHECK IF COMPUTER OR PRESSURE CONTROLLER CONTROLS GV POSITION
C
C     *****************************************************************
C
5     GVATLIM = .FALSE.
      TEMP = ISVAO-IGVCOM
      IF (TEMP.GT.PREOMROB) GVATLIM=.TRUE.
C
C
800   IF(LDSE.EQ.0.)GO TO 805
      IAOLDSEX = IAOLDSE
      AOLDSE=(REF1/MWMX)*2047.
      IAOLDSE = AOLDSE
      IF(IAOLDSE.GT.2047) IAOLDSE = 2047
      IF(IAOLDSE.LT.0) IAOLDSE=0
C              ANALOG OUTPUT OF LOADDEMAND + SPEEDERROR
      IF(RECIRCUL.AND.(IAOLDSE.GT.IAOLDSEX))IAOLDSE=IAOLDSEX
      IF(RECIRCLL.AND.(IAOLDSE.LT.IAOLDSEX))IAOLDSE=IAOLDSEX
      CALL MICCO( 1,IAOLDSE, 30,MASK)
805   IAOLESEX = IAOLESE
      IF(EQLDSEL.EQ.1.) GO TO 810
      EQIVLOAD = MW
      GO TO 820
810   GVCOM = IGVCOM
C     GE=4096 IN MOST CASES
      GVCOM = GVCOM/GE1
      EQIVLOAD = GVCOM * MWMX/100.
820   AOLESE=((EQIVLOAD-REF1)/MWMX)*1024.
840   IAOLESE = AOLESE + 1024.
      IF(IAOLESE.GT.2047) IAOLESE = 2047
      IF(IAOLESE.LT.0) IAOLESE = 0
      IF(RECIRCUL.AND.(IAOLESE.GT.IAOLESEX))IAOLESE=IAOLESEX
      IF(RECIRCLL.AND.(IAOLESE.LT.IAOLESEX))IAOLESE=IAOLESEX
C              ANALOG OUTPUT OF LOADERROR + SPEEDERROR
      CALL MICCO( 1,IAOLESE, 28,MASK)
      GO TO 430
```

```
C**********************************************************************
C
C               THROTTLE VALVE CONTROL
C
C**********************************************************************
C
1000    IF(STBPVLVS) GO TO 1200
        IF(TC) GO TO 1180
        IF(GC) GO TO 1020
        IF(TVMIN) GO TO 1120
        TVMAX=.FALSE.
        TVBIAS=0.
        TVMIN=.TRUE.
        RUNLOGIC=.TRUE.
        GO TO 1120
1020    IF(TRCOM) GO TO 1040
        IF(.NOT. GVMIN) GO TO 1180
1040    IF(TVMAX) GO TO 1120
        TVBIAS=TVBIAS+BTVC
        IF(TVBIAS .LT. 100.) GO TO 1120
        TVMIN=.FALSE.
        TVBIAS=100.
        TVMAX=.TRUE.
        RUNLOGIC=.TRUE.
1120    IF(OA) IGVAO(2) =20.47*TVBIAS
        GO TO 1200
1180    IF(OA) IGVAO(2) =GB6*SPD
C
C**********************************************************************
C
C               GOVERNOR VALVE CONTROL
C
C**********************************************************************
C
1200    IF(GC) GO TO 1220
        IF(TC) GO TO 1210
        IF(GVMIN) GO TO 1320
        GO TO 1270
1210    IF(GVMAX) GO TO 1320
        GVBIAS=GVBIAS+BGVC
        GO TO 1240
1220    IF(BR) GO TO 1365
        IF(STBPVLVS) GO TO 1385
        IF(TRCOM) GO TO 1385
        IF(GVMIN) GO TO 1385
        GVBIAS=GVBIAS-BGVC
1240    IF(GC) GO TO 1260
        IF(GVBIAS .LT. 100.) GO TO 1320
        GVMIN=.FALSE.
        TVMIN=.FALSE.
        GVBIAS=100.
        GVMAX=.TRUE.
        RUNLOGIC=.TRUE.
        GO TO 1320
1260    IF(TM) GO TO 1270
        IF(GVBIAS .GT. 0.) GO TO 1320
        IF((WSTRANS-WS).LT.WSDIP) GO TO 1320
1270    GVMAX=.FALSE.
        GVBIAS=0.
        RESSPD=GVINIT
        RESSPDX=0.
        TVBIAS=GR5*SPD/20.47
        GVMIN=.TRUE.
        RUNLOGIC=.TRUE.
1320    IF(OA) FDEM=GVBIAS
        GO TO 1500
1365    IF(OA) FDEM=(QVSP*GR18)+BIAS1
        GO TO 1500
1385    IF(OA) FDEM=SPD*GB7
1500    IF(OA) GO TO 1550
        IF(REFLLIM.OR.REFULIM.OR.RTPL) READY=.FALSE.
        GO TO 5000
1550    IGVAO(1)=FDEM
        DO 1560 I=1,2
        IF(IGVAO(I).LT.0) IGVAO(I)=0
        IF(IGVAO(I).GT.2047) IGVAO(I)=2047
1560    CONTINUE
        N=2
        IF(STBPVLVS) N=1
        CALL MICCO(N,IGVAO,IREG,MASK)
5000    CALL EXIT
        GO TO 2000
        END
```

```
C                   OPRT LOGIC
C
      IF(.NOT. (OPRT .AND. (.NOT. OPRTX))) GO TO 20
      READY=.FALSE.
      GO TO 50
20    IF(.NOT. (OPRTX .AND. (.NOT. OPRT))) GO TO 60
      IF(MODE4) GO TO 50
      RESSPD=0.
      REFDMD=0.
      ODMD=0.
50    OPRTX=OPRT
      CCO(3)=OPRT
C
C              ANALOG/DIGITAL SPEED FAILURE LOGIC
C
60    CCO(4)=ANASPDF
      CCO(5)=DIGSPDF
      CCO(6)=DIGSPDF
      CCO(38) = TRIP
C
C              TURBINE SUPERVISION OFF LOGIC
C
      TSOFF=TURBSPOF .OR. VIDAROS
      TURBSPOF=TSOFF
      MSGTSOFF=TURBSPOF
      CCO(7)=TSOFF
C
C                    OA LOGIC
C
      OA=(.NOT.TM).OR.MODE4
      IF(.NOT. (OA .AND. (.NOT. OAX))) GO TO 100
      READY=.FALSE.
      READYX=.FALSE.
100   OAX=OA
      OARB = .FALSE.
C
C           RECIRCULATION LIMITS
C
      IF(.NOT.MODE5) GO TO 110
      IF(.NOT.RECIRCHL) GO TO 105
      HLL=REFDMD
      GO TO 108
105   IF(.NOT.RECIRCLL) GO TO 110
      LLL=REFDMD
108   IF(.NOT.(ODMD.EQ.REFDMD)) HOLDCP=.TRUE.
C
C                    GO LOGIC
C
110   T1=HOLDPB .OR. HOLDCP
      T2=OA .OR. OPRT
      TCLR=(.NOT. T2) .OR. T1 .OR. GOHOLDOF
      GO=FF(OOPB,TCLR,GO)
      GORB=GO
      CCO(9)=GO
C
C                    HOLD LOGIC
C
      TCLR=(.NOT. T2) .OR. GO .OR. GOHOLDOF
      HOLD=FF(T1,TCLR,HOLD)
      HOLDPB=HOLD
      HOLDCP=.FALSE.
      GOHOLDOF=.FALSE.
      CCO(10)=HOLD
C
C                    GC LOGIC
C
      TSET=(TRPB .AND. (.NOT. TM) .AND. GVMAX .AND. (.NOT. ATS))
     1    .OR. (ATS .AND. ATSTRPB) .OR. TM .OR. STOPVLVS
      TCLR=(.NOT. ASL)
      GC=FF(TSET,TCLR,GC)
      IF(GC .AND. (.NOT. GCX)) WSTRANS=WS
      GCX=GC
      TRPB=GC
      CCO(11)=GC
C
C           IF STOPVALVES BYPASS TC LOGIC
      IF(STOPVLVS) GO TO 140
C
C                    TC LOGIC
C
      TC=(.NOT. GC) .AND. ASL
```

```
C
810    SPTF = DIGSPDF.AND.(BR.OR.ANASPDF)
       STM=OPRT.OR.(SPTF.AND.(.NOT.BR))
       CCO(8)=STM
C
C            LOW LOAD LIMIT BYPASS LOGIC
C
       TSET = (BR.AND.(.NOT.BRX)) .OR.SLLLBP
       LLLBP=FF(TSET,LLX,LLLBP)
       LLX=.FALSE.
       SLLLBP=.FALSE.
       ASLX=ASL
C
C            THROTTLE PRES SET POINT GO LOGIC
C
       T1 = TPHOLDPB .OR. TPHLDCP
       TCLR=T1.OR.GOHOLDTP.OR.MPC
       GOTPRAMP = FF(TPGOPB,TCLR,GOTRRAMP)
       CCO(34)=GOTPRAMP
       TPGOPB=GOTPRAMP
C
C            THROTTLE PRESS SET POINT HOLD LOGIC
C
       TCLR=GOTPRAMP.OR.GOHOLDTP.OR.MPC
       HOTPRAMP = FF(T1,TCLR,HOTPRAMP)
       CCO(35)=HOTPRAMP
       GOHOLDTP = .FALSE.
       TPHLDCP=.FALSE.
       TPHOLDPB=HOTPRAMP
C
C            MW IN/OUT LOGIC
C
C      T3 FLAGS BUMPLESS TRANSFER
       T3=.FALSE.
       TCLR = (.NOT.BR).OR.(.NOT.MWIPB)
      1     .OR. AIFAILMW .OR. VIDAROS.OR.MODE4
      1     .OR. (TM .AND. (.NOT. OPRT))
       MWI=FF(MWIPB,TCLR,MWI)
       AIFAILMX=AIFAILMW
       IF(.NOT. BR) GO TO 350
       IF(.NOT. (MWI .AND. (.NOT. MWIX))) GO TO 340
       REFDMD=MW-X
       Y=REF2/MW
       RESMW=Y
       RESMWX=0.
       GO TO 345
340    IF(.NOT. (MWIX .AND. (.NOT. MWI))) GO TO 350
       REFDMD=REF2-X
345    ODMD=REFDMD
C           COMPUTE REF1 FOR ANALOG SCAN XDUC CHECK
       REF1=REFDMD+X
       T3=.TRUE.
350    MWIX=MWI
       MWIPB=MWI
       CCO(15)=MWI
       CCO(16)=MWI
       CCO(17)=MWI
C
C            IMP IN/OUT LOGIC
C
360    TCLR = (.NOT.IPIPB).OR.(.NOT.BR).OR.MODE4
      1     .OR. AIFAILPI .OR. (SIO .AND. ADS) .OR. VIDAROS
      1     .OR. (TM .AND. (.NOT. OPRT))
       IPI=FF(IPIPB,TCLR,IPI)
       IF(.NOT. BR) GO TO 480
       IF(.NOT. (IPI .AND. (.NOT. IPIX))) GO TO 400
       TEMP=PI
       RESPI=VSP
       RESPIX=0.
       GO TO 450
400    IF(.NOT. (IPIX .AND. (.NOT. IPI))) GO TO 480
       TEMP=VSP
450    IF(MWI) GO TO 470
       REFDMD=(TEMP/GR3)+X
       ODMD=REFDMD
       REF2=ODMD+X
       REF1=REF2
       GO TO 475
470    REF1=REFDMD+X
       RESMW=TEMP/(GR3*REF1)
       REF2=RESMW*REF1
475    T3=.TRUE.
```

```
C
C                   AS LOGIC
C
      T1=(ASPB .AND. (.NOT. ATS)) .OR. (ATS .AND. ATSASPB)
      TSET=T1 .AND. OA .AND. (.NOT. BR) .AND. ASPERM .AND. OC
     1       .AND. (.NOT. PERSCAN)
      TCLR=(.NOT. TSET)
      AS=FF(TSET,TCLR,AS)
      IF(AS .AND. (.NOT. ASX)) T2=.TRUE.
      ASPB=AS
      ASX =AS
      CCB(26)=AS
      CCB(27)=AS
      CCB(28)=AS
      T1=AS .AND. ASUP .AND. (.NOT. ASUPX)
      IF(T1) ASINC=.TRUE.
      ASUPX=ASUP
      T1=AS .AND. ASDOWN .AND. (.NOT. ASDOWNX)
      IF(T1) ASDEC=.TRUE.
      ASDOWNX=ASDOWN
C
C                   ADS LOGIC
C
      TSET=ADSPB .AND. OA .AND. BR .AND. ADSPERM .AND. (.NOT. PERSCAN)
     1.AND.MODE5
      TCLR=(.NOT. TSET)
      ADS=FF(TSET,TCLR,ADS)
      IF(ADS .AND. (.NOT. ADSX)) T2=.TRUE.
      IF (.NOT.(ADSX.AND.(.NOT.ADS))) GO TO 550
      CADSUP=.FALSE.
      CADSDOWN=.FALSE.
      IF (ODMD.EQ.REFDMD) GO TO 550
      HOLDCP=.TRUE.
      RUNLOGIC=.TRUE.
550   ADSPB=ADS
      ADSX=ADS
C           STATUS CCB # CB32
      CCB(29)=ADS
C           SPARE
      CCB(30)=ADS
C                 LIGHT ADS PB
      CCB(31)=ADS
      IF ( ADSPULSE ) GO TO 1005
      TSET=ADS .AND. ADSUP .AND. (.NOT. ADSUPX)
      TCLR=ADS .AND. (.NOT. ADSUP) .AND. ADSUPX
      CADSUP=FF(TSET,TCLR,CADSUP)
      IF(TCLR) ADSINC=.TRUE.
      ADSUPX=ADSUP
      TSET=ADS .AND. ADSDOWN .AND. (.NOT. ADSDOWNX)
      TCLR=ADS .AND. (.NOT. ADSDOWN) .AND. ADSDOWNX
      CADSDOWN=FF(TSET,TCLR,CADSDOWN)
      IF(TCLR) ADSDEC=.TRUE.
      ADSDOWNX=ADSDOWN
      GO TO 1015
1005  IF(ADS.AND.ADSUP.AND.(.NOT.ADSUPX)) GO TO 1020
1040  IF(ADS.AND.ADSDOWN.AND.(.NOT.ADSDOWNX)) GO TO 1030
      GO TO 1010
1020  ADSCHAMT =ADSCHAMT +1
      ADSCH =.TRUE.
      GO TO 1040
1030  ADSCHAMT = ADSCHAMT-1
      ADSCH =.TRUE.
1010  ADSUPX = ADSUP
      ADSDOWNX = ADSDOWN
      IF ((ADSCHAMT.LT.-ADSCOUNT).OR.(ADSCHAMT.GT.ADSCOUNT))ADSCHAMT=0.
1015  CONTINUE
C
C                 REMOTE TRANSFER LOGIC
C
      IF(.NOT. T2) GO TO 700
      ODMD=REFDMD
      GOHOLDOF=.TRUE.
      RUNLOGIC=.TRUE.
C
C
C                 OPERATOR AUTO LIGHT LOGIC
C
700   OALITE=OA .AND. (.NOT. AS) .AND. (.NOT. ADS) .AND. (.NOT. ATS)
      CCB(33)=OALITE
C
C                 MODE3/MODE4 LOGIC
C
```

```
      IF(MODE4.AND.(.NOT.MODE4X)) BIAS1=(BIAS-GB3*GR12*100.)/GR4
      IF(MODE4X.AND.(.NOT.MODE4)) GO TO 800
      GO TO 850
  800 BIAS1=0.
      FDEM=IGVCOM/2
      REFDMD=(GR4*FDEM/(100.*GR3*GR12))-MODCHNG*X
      IF(REFDMD.GE.MWMAX) REFDMD=MWMAX
      ODMD=REFDMD
      CALL MICCO (1,0,28,2097)
  850 MODE4X=MODE4
C
C
C         PERMISSIVE FOR MODE8   (REACTOR PERMISSIVE)
C           CCO TO THE HYBRID CONTROLLER
C
      IF(TVCONT) GO TO 865
      IF(NVTEST.NE.0) GO TO 865
      IF(EQLDSEL.EQ.1) GO TO 860
      IF(AIFAILMW) GO TO 865
  860 IF(VIDAROS) GO TO 865
C         OUTPUT PERMISSIVE  (CC097)
      CCO(36)=.TRUE.
      GO TO 900
C         DO NOT OUTPUT PERMISSIVE
  865 CCO(36)=.FALSE.
C
C
C    CCO'S FOR PANEL LAMPS AND STATUS OUTPUTS
C
  900 DO 901 I=1,8
  901 ICCO(I)=0
      DO 950 I=1,38
      IF(.NOT.(CCO(I).EQB.IMCCO(I))) GO TO 950
      KKPAT=CCO(I)
      IMCCO(I)=KKPAT
      IREGNO=IREG(I)
      IBITNO=IBIT(I)
      KPAT(IREGNO,IBITNO)=KKPAT
      KCCO(IREGNO,IBITNO)=.TRUE.
  950 CONTINUE
      CALL MICCO(7,KPAT,KREG,KCCO)
      CALL EXIT
      NVTEST = INDEX2
      GO TO 2000
C
C                        OPEN BUTTON
   52 OPENPB = .TRUE.
      GO TO 2000
C
C    BYPASS VALVE BUTTON
   55 IF(NVTEST.NE.0) GO TO 4100
      IF(.NOT.VSTATUS) GO TO 2000
      TV=.FALSE.
      GV=.FALSE.
      BV=.TRUE.
C                    TURN ON BYPASS VALVE BUTTON
      CALL MICCO(N1,N12,N15,N18)
C                    TURN OFF BV & GV LIGHTS
      CALL MICCO(N1,OFF,N11,N12)
      GO TO 115
C
C          THROTTLE PRESSURE SET POINT RAMPING RATE BUTTON
   56 IPBX=N6
      GO TO 100
C
C          THROTTLE PRESSURE SET POINT GO BUTTON
   57 IF(MPC) GO TO 2000
      GOTPRAMP=.TRUE.
      TPGOPB=.TRUE.
      TPHOLDPB=.FALSE.
      GO TO 1000
C
C          THROTTLE PRESSURE SET POINT HOLD BUTTON
   58 IF(MPC) GO TO 2000
      GOTPRAMP=.FALSE.
      TPHOLDPB=.TRUE.
      TPGOPB=.FALSE.
      GO TO 1000
C
C          THROTTLE PRESSURE SET POINT BUTTON
   59 IPBX=N9
      GO TO 100
C
```

What is claimed is:

1. An electric power plant, comprising a steam turbine, an electric generator operated under the driving power of the turbine, a boiling water nuclear reactor for generating steam to drive the turbine, valve means operatively connecting the reactor steam outlet to the turbine steam inlet to control the admission of steam to the turbine, said reactor having control rods positionable within the reactor to vary the reactor energy level and having a fluid recirculation means to vary the rate of steam generation for an existing reactor energy level, an automatic reactor recirculation control means to vary the rate of steam generation in response to a change in a load demand representation, said system including a means to generate a desired load demand representation, a means to generate a pressure setpoint representation, a pressure control means to position the valve means to control the steam pressure between the reactor outlet and the valve means to correspond to the pressure setpoint representation, a means responsive to a change in the generated load demand representation to change the pressure setpoint representation in anticipation of a change in the rate of steam generation, means to detect the limits of operational capability of the recirculation system, and a means responsive to one of the detected limits to render a change in the generated load demand representation ineffective to operate the pressure control means to anticipate a change in the rate of steam generation beyond the limits of capability of the recirculation system.

2. An electric power plant as set forth in claim 1, wherein the means to change the pressure setpoint representation in response to a change in the load demand representation is a deriviative circuit.

3. An electric power plant as set forth in claim 1, wherein the automatic control means further includes a means to detect the megawatt output of the generator, and the change in load demand representation to operate the reactor recirculation means is an error signal determined by the generated load demand representation and the detected megawatt output.

4. An electric power plant as set forth in claim 1 wherein the automatic control means includes a digital/analog system and the means responsive to the detected recirculation limits includes a programmed digital computer.

5. An electric power plant as set forth in claim 1 wherein the capability limit of the recirculation system include both upper and lower limits, and a change in the load demand representation in the direction of the detected limit is prevented in response to such detected limit.

6. A system for automatically operating a combined boiling water reactor steam turbine power plant having a recirculation system for varying the rate of steam generation between the limits of its operational capability at an existing reactor power level comprising means to generate an electrical representation of load demand for the turbine, means to generate an electrical representation of a desired pressure setpoint for steam between the reactor and turbine, means to control the pressure of the steam to correspond to the setpoint representation, means responsive to a change in the load demand representation to change the pressure setpoint representation in anticipation of a change in the rate of steam generation, means responsive to a change in the load demand representation to operate the recirculation system to change the rate of steam generation within the limits of its capability, means to detect the operational limits of the recirculation system, and a means responsive to a detected operational limit of the recirculation system to render a change in the load demand representation ineffective to operate the pressure control means to anticipate a change in the rate of steam generation beyond the limits of capability of the recirculation system.

7. A system according to claim 6, further comprising means to determine the megawatt output of the power plant, and the means to operate the recirculation system responds to a load demand error representation determined by the generated load demand representation and the actual detected megawatt output.

8. A system according to claim 6 wherein the means to generate the load demand representation and the means responsive to the recirculation limits is a programmed digital computer.

9. A system according to claim 6 wherein the means responsive to the detected limit of the recirculation system prevents a change in the generated load demand representation.

10. A system according to claim 6 wherein the means to change the pressure setpoint representation is a derivative circuit.

\* \* \* \* \*